United States Patent
Peng et al.

(10) Patent No.: US 12,107,764 B2
(45) Date of Patent: Oct. 1, 2024

(54) PACKET PROCESSING METHOD FOR IMPLEMENTING QOS GUARANTEE, DEVICE, AND SYSTEM

(71) Applicant: HUAWEI TECHNOLOGIES CO., LTD., Guangdong (CN)

(72) Inventors: Shuping Peng, Beijing (CN); Zhenbin Li, Beijing (CN); Lei Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/550,115

(22) Filed: Dec. 14, 2021

(65) Prior Publication Data

US 2022/0103477 A1    Mar. 31, 2022

Related U.S. Application Data

(63) Continuation of application No. PCT/CN2020/078778, filed on Mar. 11, 2020.

(30) Foreign Application Priority Data

Jun. 15, 2019   (CN) .......................... 201910518592.9

(51) Int. Cl.
*H04L 45/745* (2022.01)
*H04L 12/46* (2006.01)
(Continued)

(52) U.S. Cl.
CPC ........ *H04L 45/745* (2013.01); *H04L 12/4633* (2013.01); *H04L 12/4641* (2013.01); *H04L 45/24* (2013.01); *H04L 45/42* (2013.01)

(58) Field of Classification Search
CPC ............... H04L 45/745; H04L 12/4633; H04L 12/4641; H04L 45/24; H04L 45/42;
(Continued)

(56) References Cited

U.S. PATENT DOCUMENTS 11,695,690 B1 *   7/2023   Wijnands .............. H04L 67/104
                                                    709/238
11,902,118 B2 *   2/2024   Cociglio ................. H04L 43/12
(Continued)

FOREIGN PATENT DOCUMENTS

CN      103841022 A      6/2014
CN      108011824 A      5/2018
(Continued)

OTHER PUBLICATIONS

International Search Report and Written Opinion issued in PCT/CN2020/078778, dated May 28, 2020, 10 pages.
(Continued)

*Primary Examiner* — Bryan Y Lee

(57) ABSTRACT

A packet processing method implements a QoS guarantee. The method includes: obtaining a flow identification based on packet attribute information and a flow matching rule, generating a flow policy that includes a correspondence between the flow identification and a flow behavior, determining a forwarding path of a packet including the packet attribute information, sending the flow matching rule to an ingress device of the forwarding path, and sending the flow policy to a first network device on the forwarding path. The ingress device adds the flow identification to the packet including the packet attribute information, and sends the packet. The first network device receives the packet including the flow identification, obtains the flow behavior from the flow policy based on the flow identification, and processes the packet in a packet processing mode corresponding to the flow behavior.

19 Claims, 12 Drawing Sheets

(51) Int. Cl.
*H04L 45/24* (2022.01)
*H04L 45/42* (2022.01)

(58) Field of Classification Search
CPC ....... H04L 45/302; H04L 45/64; H04L 47/24; H04L 47/2491; H04L 45/00; H04L 47/20
USPC .................................................. 709/238–244
See application file for complete search history.

(56) References Cited

U.S. PATENT DOCUMENTS

| | | | |
|---|---|---|---|
| 2013/0177016 A1* | 7/2013 | Nakano | H04L 12/4633 370/389 |
| 2014/0192806 A1 | 7/2014 | Yadav et al. | |
| 2015/0249608 A1* | 9/2015 | Zhang | H04L 47/125 709/226 |
| 2017/0064717 A1* | 3/2017 | Filsfils | H04L 45/50 |
| 2018/0109450 A1 | 4/2018 | Filsfils et al. | |
| 2018/0131622 A1* | 5/2018 | Liang | H04L 45/033 |
| 2018/0219783 A1* | 8/2018 | Pfister | H04L 67/1027 |
| 2018/0279013 A1* | 9/2018 | Chen | H04N 19/107 |

FOREIGN PATENT DOCUMENTS

| | | |
|---|---|---|
| CN | 110535782 A | 12/2019 |
| WO | 2016115850 A1 | 7/2016 |

OTHER PUBLICATIONS

Paolucci Francesco: "Network service chaining using segment routing in multi-layer networks", vol. 10, No. 6, Jun. 1, 2018 (Jun. 1, 2018), pp. 582-592, XP011685201.

Geng M Mach Huawei X: "DetNet SRv6 Data Plane Encapsulation;draft-geng-detnet-dp-sol-srv6-00.txt", Mar. 11, 2019 (Mar. 11, 2019), pp. 1-16, XP015131754.

Extended European Search Report dated May 20, 2022 issued for European Application No. 20825526.5 (8 pages).

Office Action dated Jun. 20, 2023 issued for Chinese Application No. 110535782 (40 pages).

* cited by examiner

PACKET PROCESSING METHOD FOR IMPLEMENTING QOS GUARANTEE, DEVICE, AND SYSTEM

CROSS-REFERENCE TO RELATED APPLICATIONS

This application is a continuation of International Application No. PCT/CN2020/078778, filed on Mar. 11, 2020, which claims priority to Chinese Patent Application No. 201910518592.9, filed on Jun. 15, 2019. The disclosures of the aforementioned applications are hereby incorporated by reference in their entireties.

TECHNICAL FIELD

This disclosure relates to the communications field, and in particular, to a packet processing method for implementing QoS guarantee, a network device, and a system.

BACKGROUND

Quality of service (QoS) is a technology that provides services for users by using different service models based on network quality and user requirements. QoS is very important for networks with limited capacity. Differentiated service (DiffServ, DS) is a service model in QoS. A packet header of each packet carries a differentiated services code point (DSCP) to indicate a class of service corresponding to the packet. The DSCP uses six bits, ranging from 0 to 63. Each DSCP is mapped to a defined per-hop behavior (PHB). All nodes on a forwarding path can obtain the DSCP in the packet header through parsing, map a same PHB based on the DSCP, and process the packet according to a packet processing mode corresponding to the PHB. That is, after the DSCP of the packet is determined, a mode in which all nodes on the forwarding path process the packet based on the DSCP is also fixed. In one aspect, a packet processing mode corresponding to a DSCP cannot be changed based on network requirements. In another aspect, a packet processing mode adopted by a node cannot be customized based on factors such as a network location of the node. An existing service-specific QoS guarantee solution is inflexible.

SUMMARY

This disclosure provides a packet processing method for implementing QoS guarantee, to resolve a technical problem of inflexible QoS guarantee for a service.

According to a first aspect, a packet processing method is provided. The method includes: first, obtaining a flow identification based on packet attribute information and a flow matching rule, where the flow matching rule includes a correspondence between the packet attribute information and the flow identification, and the flow identification is used to identify a packet including the packet attribute information; then, generating a first flow policy, where the first flow policy includes a correspondence between the flow identification and a first flow behavior; determining a forwarding path of the packet including the packet attribute information; sending the flow matching rule to an ingress device of the forwarding path, where the flow matching rule is used to indicate to the ingress device to add the flow identification to the packet including the packet attribute information; and sending the first flow policy to a first network device on the forwarding path, where the first flow policy is used to indicate to the first network device to process, in a packet processing mode corresponding to the first flow behavior, the packet including the flow identification.

The method may be performed by a controller or a network management device. The flow identification is determined based on the packet attribute information, and the flow policy that includes the flow identification and the flow behavior is sent to a specific network device, so that a customized packet processing mode can be provided on the specific network device, and more flexible QoS guarantee can be provided for a service.

In a possible example embodiment, the determining of a forwarding path of the packet including the packet attribute information includes: obtaining path information used to determine the forwarding path, where the path information includes a destination address; and calculating the forwarding path based on the path information. The method further includes: generating a segment identification list corresponding to the forwarding path, where the segment identification list includes a segment identification of a network device on the forwarding path. The method is applicable to an initial path computation phase before packet forwarding. After calculating the forwarding path used to forward the packet, the controller sends the flow matching rule to an ingress node of the forwarding path, so that the ingress node adds the flow identification to the packet, and sends the flow policy to the first network device on the forwarding path, so that the first network device obtains the flow behavior from the flow policy based on the flow identification, and processes the packet according to the packet processing method corresponding to the flow behavior.

In a possible example embodiment, the determining of a forwarding path of the packet including the packet attribute information includes: obtaining path information used to determine the forwarding path, where the path information includes a destination address; and searching for the forwarding path based on the path information. The method further includes: selecting a segment identification list corresponding to the forwarding path, where the segment identification list includes a segment identification of a network device on the forwarding path. The method is applicable to a phase in which the packet is normally forwarded, to be specific, the controller has calculated one or more forwarding paths used to forward the packet, and a forwarding device has forwarded the packet according to the forwarding path calculated by the controller. When a packet processing mode of a device on the packet forwarding path needs to be changed, the controller needs to find, from a plurality of forwarding paths, the forwarding path that is currently used for packet forwarding. Then, the controller sends the flow matching rule to an ingress node of the forwarding path, so that the ingress node adds the flow identification to the packet, and sends the flow policy to the first network device on the forwarding path, so that the first network device obtains the flow behavior from the flow policy based on the flow identification, and processes the packet according to the packet processing method corresponding to the flow behavior. The method is also applicable to a normal forwarding phase, and can provide flexible QoS guarantee in different phases of packet transmission.

In a possible example embodiment, the method further includes: sending the segment identification list to the ingress device, where the segment identification list is used to indicate to forward a packet including the path information and the packet attribute information along the forwarding path.

In a possible example embodiment, the sending the segment identification list to the ingress device includes: sending a correspondence between the path information and the segment identification list to the ingress device, or sending a correspondence between a combination of the path information and the flow identification and the segment identification list to the ingress device.

In a possible example embodiment, the segment identification list includes a first segment identification, the first segment identification is a segment identification of the first network device, and the method further includes: adding the flow identification to the first segment identification; and sending the segment identification list including the flow identification to the ingress device, where the segment identification list is used to indicate to forward a packet including the path information and the packet attribute information along the forwarding path. In this method, the controller may add the flow identification to the segment identification list, thereby simplifying a packet processing process of the ingress device. Specifically, the controller adds the flow identification to the segment identification corresponding to the first network device in the segment identification list, so that a carrying mode of the flow identification is clearer, and the first network device can more conveniently obtain the flow identification through parsing.

In a possible example embodiment, the first segment identification includes a function field and an argument field, and the adding of the flow identification to the first segment identification includes: adding the flow identification to the argument field; and adding a read identification to the function field, where the read identification is used to indicate to read the flow identification in the argument field of the first segment identification. The method defines a new segment identification type and a new function. The new segment identification type is used to carry the flow identification, and the new function is used to read the flow identification from the segment identification, so as to search for the flow policy and execute a corresponding flow behavior.

In a possible example embodiment, that the flow matching rule is used to indicate to the ingress device to add the flow identification to the packet including the packet attribute information includes: The flow matching rule is used to indicate to the ingress device to encapsulate the segment identification list including the flow identification into the packet including the packet attribute information. When the controller adds the flow identification to the segment identification list, the ingress device encapsulates the segment identification list including the flow identification into the packet, thereby simplifying a packet processing process of the ingress device.

In a possible example embodiment, the path information further includes a network performance requirement, and the network performance requirement includes at least one of the following: a latency, a bandwidth, a jitter, or a packet loss rate.

In a possible example embodiment, the packet attribute information includes at least one of the following: identification information of an application, network performance requirement information of an application, a virtual local area network (VLAN) tag, identification information of a user, a priority of a packet, or a DSCP of the packet. The packet attribute information includes the identification information of the application. That is, the flow identification is associated with the application, and the flow identification reflects the application to which the packet belongs. Therefore, application-based packet classification is implemented, so that packet classification is more refined. Then, different flow behaviors are corresponded based on the flow identification, making an application-based refined differentiated service possible.

In a possible example embodiment, the method further includes: generating the flow matching rule based on the packet attribute information.

In a possible example embodiment, the method further includes: generating a second flow policy, where the second flow policy includes a correspondence between the flow identification and a second flow behavior, where the second flow behavior is different from the first flow behavior; and sending the second flow policy to the first network device, where the second flow policy is used to indicate to the first network device to process, in a packet processing mode corresponding to the second flow behavior, the packet including the flow identification. The controller may send a plurality of different flow policies to the network device on the forwarding path, thereby enriching a service processing mode.

In a possible example embodiment, the method further includes: generating a second flow policy, where the second flow policy includes a correspondence between the flow identification and a second flow behavior, where the second flow behavior is different from the first flow behavior; and sending the second flow policy to a second network device, where the second network device is a network device on the forwarding path, and the second flow policy is used to indicate to the second network device to process, in a packet processing mode corresponding to the second flow behavior, the packet including the flow identification. The controller may send the flow policy to a plurality of network devices on the forwarding path, and may send different flow policies to different network devices, so that different packet processing is performed on different network devices for a packet corresponding to a same flow identification, thereby providing flexible QoS guarantee for the service.

In a possible example embodiment, the segment identification list includes a second segment identification, and the first segment identification is a segment identification of the second network device, and the method further includes: adding the flow identification to the second segment identification; and sending the segment identification list including the flow identification to the ingress device, where the segment identification list is used to indicate to forward a packet including the path information and the packet attribute information along the forwarding path. When the plurality of network devices on the forwarding path need to perform packet processing, the controller may separately add the flow identification to segment identifications corresponding to the plurality of network devices, so that a network device that does not need to perform packet processing no longer obtains the flow identification, thereby simplifying processing.

In a possible example embodiment, the second segment identification includes a function field and an argument field, and the adding of the flow identification to the second segment identification includes: adding the flow identification to the argument field of the second segment identification; and adding a read identification to the function field of the second segment identification, where the read identification is used to indicate to read the flow identification in the argument field of the second segment identification.

According to a second aspect, a packet processing method is provided. The method includes: receiving a flow matching rule sent by a controller, where the flow matching rule includes a correspondence between packet attribute information and a flow identification; receiving a packet including the packet attribute information; obtaining the flow identification based on the packet attribute information and the flow matching rule; adding the flow identification to the packet; and forwarding the packet including the flow identification along a forwarding path.

The method may be performed by an ingress node of a network. The flow identification is determined based on the packet attribute information, and the flow identification is added to the packet. A subsequent network device on the packet forwarding path may determine a specific flow behavior by using the flow identification and a flow policy, so that a customized packet processing mode can be provided on a specific network device, and more flexible QoS guarantee can be provided for a service.

In a possible example embodiment, the method further includes: receiving a segment identification list corresponding to the forwarding path, where the segment identification list includes a segment identification of a network device on the forwarding path, and the segment identification list includes the flow identification. The adding of the flow identification corresponding to the packet attribute information to the packet includes: encapsulating the segment identification list including the flow identification into the packet. When the controller adds the flow identification to the segment identification list, the ingress device encapsulates the segment identification list including the flow identification into the packet.

In a possible example embodiment, the method further includes: receiving a segment identification list corresponding to the forwarding path, where the segment identification list includes a segment identification of a network device on the forwarding path. The adding of the flow identification corresponding to the packet attribute information to the packet includes: adding the flow identification to a first segment identification in the segment identification list, where the first segment identification is a segment identification of a first network device; and encapsulating the segment identification list including the flow identification into the packet. In this method, an ingress device of the forwarding path may add the flow identification to the segment identification list, and further encapsulate the segment identification list into the packet. Specifically, the ingress device adds the flow identification to the segment identification corresponding to the first network device in the segment identification list. Further, the segment identification is put into an address (destination address (DA)) field in an SRH by a previous-hop node that is of the first network device and that is on the packet forwarding path. Therefore, the first network device obtains the flow identification from the DA field, so that parsing of the flow identification is more convenient.

In a possible example embodiment, the first segment identification includes a function field and an argument field, and the adding of the flow identification to the first segment identification in the segment identification list includes: adding the flow identification to the argument field; and adding a read identification to the function field, where the read identification is used to indicate to read the flow identification in the argument field of the first segment identification. The method defines a new segment identification type and a new function. The new segment identification type is used to carry the flow identification, and the new function is used to read the flow identification from the segment identification, so as to search for the flow policy and execute a corresponding flow behavior.

In a possible example embodiment, the adding of the flow identification corresponding to the packet attribute information to the packet includes: adding the flow identification to a type-length-value (TLV) of a segment routing header (SRH) of the packet. In the method, the ingress device of the forwarding path may add the flow identification to a TLV field of the SRH, and the first network device on the forwarding path obtains the flow identification by parsing the TLV field of the SRH.

In a possible example embodiment, the adding of the flow identification corresponding to the packet attribute information to the packet includes: adding the flow identification to a traffic class (TC) field or a type of service (ToS) field in a header of the packet. In the method, the ingress device of the forwarding path may add the flow identification to a field in a header of an IPv4 packet, or add the flow identification to a TC field in a header of an IPv6 packet, that is, the flow identification is used to overwrite an original DSCP.

In a possible example embodiment, the packet attribute information includes at least one of the following: identification information of an application, network performance requirement information of an application, a VLAN tag, identification information of a user, a priority of a packet, or a DSCP of the packet. The packet attribute information includes the identification information of the application. That is, the flow identification is associated with the application, and the flow identification reflects the application to which the packet belongs. Therefore, application-based packet classification is implemented, so that packet classification is more refined. Then, different flow behaviors are corresponded based on the flow identification, making an application-based refined differentiated service possible.

In a possible example embodiment, the flow identification is used to indicate to the first network device on the forwarding path to process the packet including the flow identification in a packet processing mode corresponding to a first flow behavior, and the flow identification is further used to indicate a second network device on the forwarding path to process the packet including the flow identification in a packet processing mode corresponding to a second flow behavior, where the second flow behavior is different from the first flow behavior.

In a possible example embodiment, the method further includes: receiving a segment identification list corresponding to the forwarding path, where the segment identification list includes a segment identification of a network device on the forwarding path. The adding of the flow identification corresponding to the packet attribute information to the packet includes: adding the flow identification to a first segment identification and a second segment identification in the segment identification list, where the first segment identification is a segment identification of the first network device; and the second segment identification is a segment identification of the second network device; and encapsulating the segment identification list including the flow identification into the packet. The ingress device may add the flow identification to segment identifications of a plurality of network devices on the forwarding path in the segment identification list, to indicate to the plurality of network devices to perform packet processing, thereby providing flexible QoS guarantee for the service.

In a possible example embodiment, the second segment identification includes a function field and an argument field, and the adding of the flow identification to the second segment identification in the segment identification list includes: adding the flow identification to the argument field of the second segment identification; and adding a read identification to the function field of the second segment identification, where the read identification is used to indicate to read the flow identification in the argument field of the second segment identification.

According to a third aspect, a packet processing method is provided. The method includes: receiving a flow policy sent by a controller, where the flow policy includes a correspondence between a flow identification and a flow behavior, and the flow identification is used to identify a packet including packet attribute information; receiving a packet including the flow identification, and obtaining the flow identification from the packet; obtaining the flow behavior from the flow policy based on the flow identification; and processing, in a packet processing mode corresponding to the flow behavior, the packet including the flow identification.

The method may be performed by a network device on a forwarding path. A flow policy that includes the flow identification and the flow behavior is received, and a corresponding flow behavior is obtained from the flow policy based on the flow identification in the packet, so that a customized packet processing mode can be provided on the network device, and more flexible QoS guarantee can be provided for a service.

In a possible example embodiment, the obtaining the flow identification from the packet includes: obtaining a segment identification from a destination address (DA) field in a header of the packet; and obtaining the flow identification from the segment identification. A segment identification that is encapsulated in a segment identification list in the packet and that is corresponding to the network device on the forwarding path is added to the DA field in the header by a previous-hop network device of the network device. The network device obtains the flow identification in the segment identification from the DA field, so that a flow identification parsing process is simpler.

According to a fourth aspect, a network device is provided, and performs the method in any one of the first aspect or the possible implementations of the first aspect. Specifically, the network device includes units configured to perform the method in any one of the first aspect or the possible implementations of the first aspect.

According to a fifth aspect, a network device is provided, and performs the method in any one of the second aspect or the possible implementations of the second aspect. Specifically, the network device includes units configured to perform the method in any one of the second aspect or the possible implementations of the second aspect.

According to a sixth aspect, a network device is provided, and performs the method in any one of the third aspect or the possible implementations of the third aspect. Specifically, the network device includes units configured to perform the method in any one of the third aspect or the possible implementations of the third aspect.

According to a seventh aspect, a network device is provided. The network device includes a processor, a network interface, and a memory. The network interface may be a transceiver. The memory may be configured to store program code, and the processor is configured to invoke the program code in the memory to perform the method in any one of the first aspect or the possible implementations of the first aspect. Details are not described herein again.

According to an eighth aspect, a network device is provided. The network device includes a processor, a network interface, and a memory. The network interface may be a transceiver. The memory may be configured to store program code, and the processor is configured to invoke the program code in the memory to perform the method in any one of the second aspect or the possible implementations of the second aspect. Details are not described herein again.

According to a ninth aspect, a network device is provided. The network device includes a processor, a network interface, and a memory. The network interface may be a transceiver. The memory may be configured to store program code, and the processor is configured to invoke the program code in the memory to perform the method in any one of the third aspect or the possible implementations of the third aspect. Details are not described herein again.

According to a tenth aspect, a network device is provided. The network device includes a main control board and an interface board. The main control board includes a first processor and a first memory. The interface board includes a second processor, a second memory, and an interface card. The main control board and the interface board are coupled. The first memory may be configured to store program code. The first processor is configured to invoke the program code in the first memory to perform the following operations: determine a forwarding path used to forward a packet, where the forwarding path includes a first network device; obtain a flow identification based on packet attribute information and a flow matching rule, where the flow matching rule includes a correspondence between the packet attribute information and the flow identification, and the flow identification is used to identify a packet including the packet attribute information; and generate a first flow policy, where the first flow policy includes a correspondence between the flow identification and a first flow behavior.

The second memory may be configured to store program code. The second processor is configured to invoke the program code in the second memory, to trigger the interface card to perform the following operations: send the flow matching rule to an ingress device of the forwarding path, where the flow matching rule is used to indicate to the ingress device to add the flow identification to the packet including the packet attribute information; and send the first flow policy to the first network device, where the first flow policy is used to indicate to the first network device to process, in a packet processing mode corresponding to the first flow behavior, the packet including the flow identification.

According to an eleventh aspect, a network device is provided. The network device includes a main control board and an interface board. The main control board includes a first processor and a first memory. The interface board includes a second processor, a second memory, and an interface card. The main control board and the interface board are coupled. The first memory may be configured to store program code. The first processor is configured to invoke the program code in the first memory to perform the following operations: obtain a flow identification based on the packet attribute information and the flow matching rule, add the flow identification to the packet; and determine a forwarding path used to forward the packet.

The second memory may be configured to store program code. The second processor is configured to invoke the program code in the second memory, to trigger the interface card to perform the following operations: receive the flow matching rule sent by a controller, where the flow matching rule includes a correspondence between the packet attribute information and the flow identification; receive a packet including the packet attribute information; and forward the packet including the flow identification along the forwarding path, where the flow identification is used to indicate a first network device on the forwarding path to process the packet including the flow identification in a packet processing mode corresponding to a first flow behavior.

According to a twelfth aspect, a network device is provided. The network device includes a main control board and an interface board. The main control board includes a first processor and a first memory. The interface board includes a second processor, a second memory, and an interface card. The main control board and the interface board are coupled. The first memory may be configured to store program code. The first processor is configured to invoke the program code in the first memory to perform the following operations: obtain a flow identification from a packet, obtain the flow behavior from the flow policy based on the flow identification, and process the packet in a packet processing mode corresponding to the flow behavior.

The second memory may be configured to store program code. The second processor is configured to invoke the program code in the second memory, to trigger the interface card to perform the following operations: receive a flow policy sent by a controller, where the flow policy includes a correspondence between a flow identification and a flow behavior, and the flow identification is used to identify a packet including packet attribute information; and receive a packet including the flow identification.

In a possible implementation, an inter-process communication (IPC) channel is established between the main control board and the interface board, and the main control board and the interface board communicate with each other through the IPC channel.

According to a thirteenth aspect, a network system is provided. The network system includes a controller, a first network device, and a second network device. The controller is configured to: obtain a flow identification based on packet attribute information and a flow matching rule, where the flow matching rule includes a correspondence between the packet attribute information and the flow identification, and the flow identification is used to identify a packet including the packet attribute information; generate a first flow policy, where the first flow policy includes a correspondence between the flow identification and a first flow behavior; determine a forwarding path of the packet including the packet attribute information; send the flow matching rule to an ingress device of the forwarding path, to indicate to the ingress device to add the flow identification to the packet including the packet attribute information; and send the first flow policy to the first network device on the forwarding path, to indicate to the first network device to process, in a packet processing mode corresponding to the first flow behavior, the packet including the flow identification.

The first network device is configured to: receive the flow matching rule sent by the controller; receive the packet including the packet attribute information; obtain the flow identification based on the packet attribute information and the flow matching rule; add the flow identification to the packet; and forward the packet including the flow identification along the forwarding path.

The second network device is configured to: receive the flow policy sent by the controller; receive the packet including the flow identification, and obtain the flow identification from the packet; obtain the flow behavior from the flow policy based on the flow identification; and process, in a packet processing mode corresponding to the flow behavior, the packet including the flow identification.

According to a fourteenth aspect, a computer-readable storage medium is provided. The computer-readable storage medium stores instructions, and when the instructions are run on a computer, the computer is enabled to perform the methods according to the foregoing aspects.

According to a fifteenth aspect, a computer program product including computer program instructions is provided. When the computer program product is run on a network device, the network device is enabled to perform the method provided in the first aspect, the second aspect, the third aspect, any one of the possible implementations of the first aspect, any one of the possible implementations of the second aspect, or any one of the possible implementations of the third aspect.

According to a sixteenth aspect, a chip is provided, including a memory and a processor. The memory is configured to store a computer program, and the processor is configured to invoke the computer program from the memory and execute the computer program, to perform the method in any one of the first aspect or the possible implementations of the first aspect, or perform the method in any one of the second aspect or the possible implementations of the second aspect.

Optionally, the chip includes only the processor, and the processor is configured to read and execute the computer program stored in the memory. When the computer program is executed, the processor performs the method in any one of the first aspect or the possible implementations of the first aspect, or the processor performs the method in any one of the second aspect or the possible implementations of the second aspect.

BRIEF DESCRIPTION OF DRAWINGS

To describe the technical solutions of this disclosure more clearly, the following briefly describes the accompanying drawings used in the embodiments. It is clearly that the accompanying drawings in the following description merely show some embodiments of this disclosure, and a person of ordinary skill in the art can derive other technical solutions and accompanying drawings from these accompanying drawings without creative efforts.

FIG. 2A-1 and FIG. 2A-2 are a schematic flowchart of a packet processing method according to an embodiment of this disclosure;

DESCRIPTION OF EMBODIMENTS

The following describes embodiments of this disclosure with reference to accompanying drawings.

Figure 1:
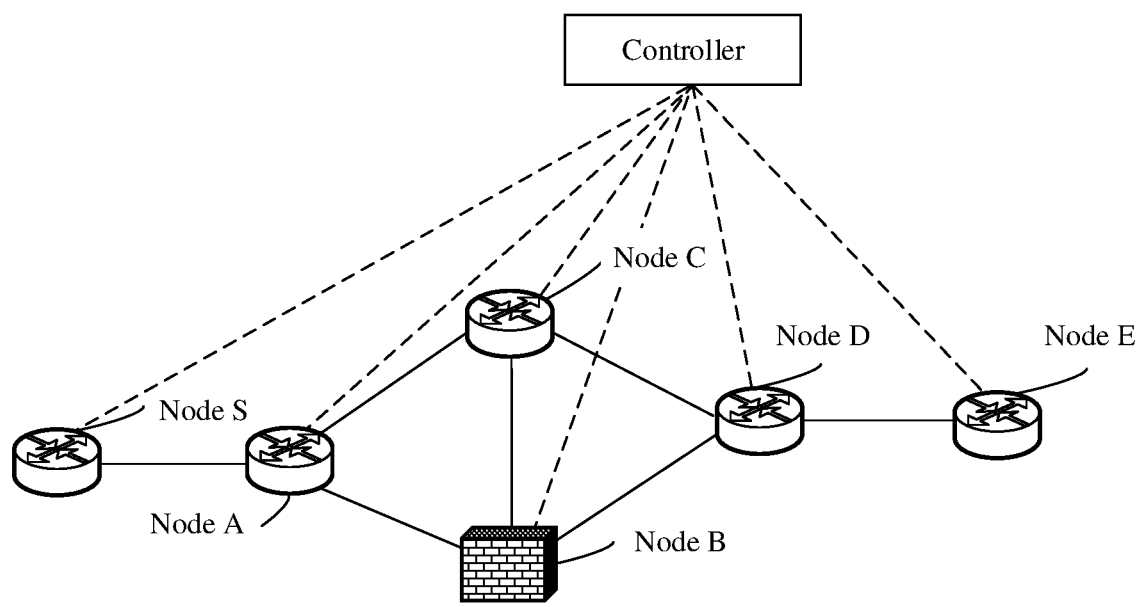
FIG. 1 is a schematic diagram of an application scenario according to an embodiment of this disclosure.

FIG. 1 shows a possible application scenario according to an embodiment of this disclosure. The scenario includes an SR network. The SR network includes a controller and several nodes, for example, a node S, a node A, a node B, a node C, a node D, and a node E. The node S may be an SR network ingress device, or may be referred to as an ingress node or an ingress provider edge (PE) device. The node B is a device having a specific network function, for example, a firewall. The node A, the node C, the node D, and the node E may be network devices, for example, a router, a switch, or a forwarder in a software-defined networking (SDN) structure. The controller may be a network management device or a controller in an SDN architecture. The controller may generate a segment routing policy (SR policy) including a segment identification list, and send the SR policy to a network ingress node, for example, the node S. The segment identification list corresponds to a forwarding path of a packet. For example, the forwarding path successively passes through the node A, the node B, the node C, the node D, and the node E. The segment identification list corresponding to the forwarding path includes segment identifications of the node A, the node B, the node C, the node D, and the node E. The controller may further send, to each node in the network, a control packet including network configuration information.

The embodiments of this disclosure provide a packet processing method for implementing QoS guarantee, and a device and system based on the method. The method, the device, and the system are based on a same inventive concept. Principles of resolving problems by the method, the device, and the system are similar. Therefore, for the embodiments of the method, the device, and the system, refer to each other, and same or similar content is not described again.

Figures 1, 2A:
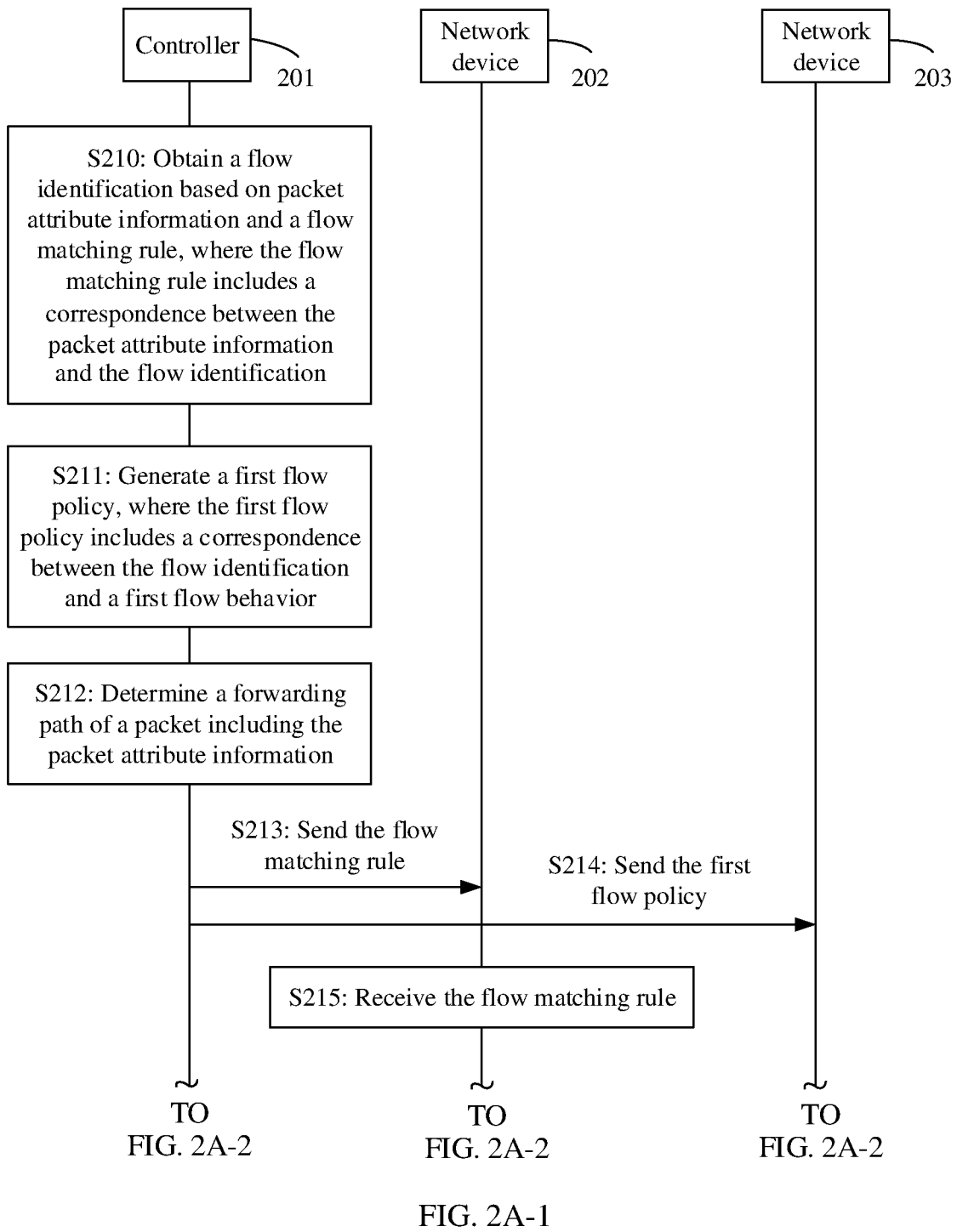
Figures 2, 2A:
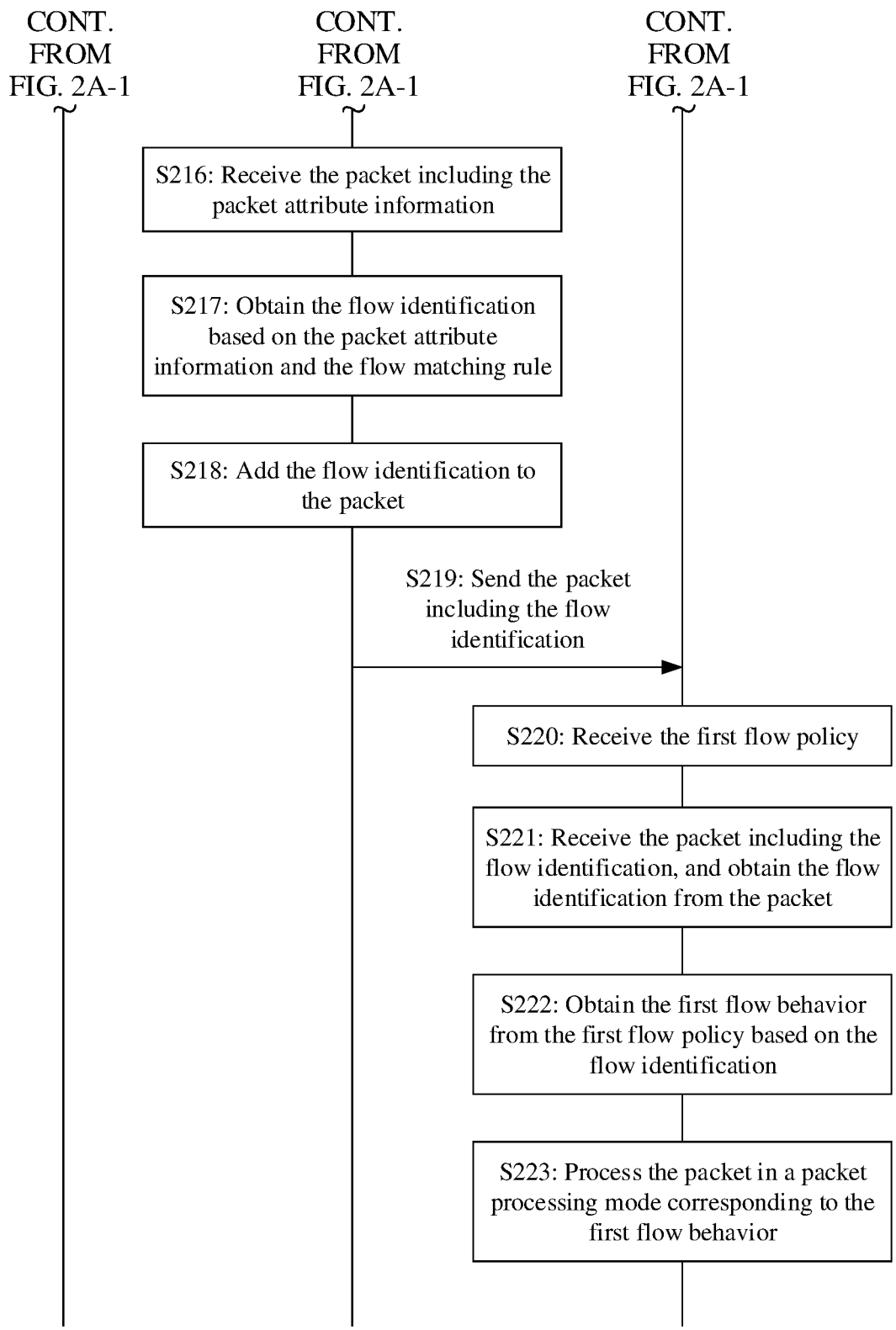

Refer to FIG. 2A-1 and FIG. 2A-2. An embodiment of this disclosure provides a packet processing method. In the method, a controller determines a flow identification based on packet attribute information, and sends a flow policy that includes the flow identification and a flow behavior to a specific network device. An ingress node of a forwarding path determines the flow identification based on the packet attribute information in a packet, and adds the flow identification to the packet. Another node matches the flow identification in the packet to the flow behavior in the flow policy, and processes, in a packet processing mode corresponding to the flow behavior, the packet including the flow identification. In this method, an index is provided for the packet attribute information in the packet by using the flow identification, and a flexible correspondence mode is provided for the flow identification and the flow behavior by using the flow policy. The another node obtains the corresponding flow behavior based on the flow identification in the packet, without parsing the packet attribute information in the packet, so that packet processing efficiency is improved. A specific flow policy is directly sent to a specific network device, so that a customized packet processing mode can be provided on the specific network device, and more flexible QoS guarantee can be provided for a service. In addition, in this method, the flow identification can map a richer combination of packet attribute information, so that more refined QoS guarantee can be provided.

In the embodiment shown in FIG. 2A-1, the controller 201 is a controller in an SR network, for example, the controller in FIG. 1. A network device 202 may be an ingress node of the SR network, for example, the node S in FIG. 1. A network device 203 may be a network node in the SR network, for example, the node A, the node B, the node C, the node D, or the node E in FIG. 1. The method includes:

S210: The controller 201 obtains the flow identification based on the packet attribute information and a flow matching rule. The packet attribute information is included in the packet, and is used to identify an attribute of the packet. The flow matching rule includes a correspondence between the packet attribute information and the flow identification, and the flow identification is used to identify the packet including the packet attribute information.

The packet attribute information may include at least one of the following: identification information of an application, network performance requirement information of an application, identification information of a user, a VLAN tag, a priority of a packet, or a DSCP.

The identification information of the application (APP ID) is used to identify the application. The APP ID may uniquely identify an application, that is, an APP ID of each application is different. The APP ID may be a protocol feature word, an application attribute code, or the like of the application. Alternatively, the APP ID may uniquely identify a type of application, that is, the APP ID may reflect an application type, and applications of a same type correspond to a same APP ID. For example, application information of a game type corresponds to a same APP ID. The APP ID may be a character string.

The network performance requirement information of the application indicates a network performance requirement of one application or a type of applications for a network system. For example, the network performance requirement information of the application may be represented as one or more pieces of information such as bandwidth, latency, latency jitter, packet loss, reliability, and security. The network performance requirement information of the application may be represented in a form of a specific value (for example, a minimum bandwidth or an upper latency limit) of information, for example, the bandwidth or the latency, may be a service level agreement (SLA) that represents information, for example, the bandwidth or the latency, or may be a path attribute of a path computation algorithm. The SLA specifies multi-dimensional network performance requirements. For example, the bandwidth is 150 M, the upper latency limit is 5 ms, and the latency jitter is +/−2 ms. The path attribute may be represented by a color. For example, red indicates that the network performance requirement information of the application is a high bandwidth, and blue indicates that the network performance requirement information of the application is a low latency. The SLA may also be represented by a color. For example, a red SLA indicates a high bandwidth and a low latency, or a blue SLA represents a low bandwidth. It should be noted that, in the embodiment of this disclosure, "high" and "low" are relative terms, and which value is "high" and which value is "low" are determined by a person skilled in the art. In addition, the network performance requirement information of the application in the packet attribute information and network performance requirement information in path information may be the same information, or may be different information.

User identification information (user ID) is used to identify a user. The user may be a user of the application, that is, a natural person. The user ID may uniquely identify a user, that is, a user ID of each user is different. The user ID may be represented as a character string. For example, the user ID is Alice.

The VLAN tag may be a C-VLAN tag or an S-VLAN tag.

The priority of the packet may be eight IP priorities defined in institute of electrical and electronics engineers 802.1P (IEEE 802.1P) protocol.

The DSCP of the packet may be a DSCP specified in a QoS classification standard of differentiated services published by an internet engineering task force (IETF).

In an example, the packet attribute information is sent by the ingress node of the forwarding path to the controller 201. The ingress node obtains the packet attribute information from the packet, and sends the packet attribute information to the controller 201.

In an example, the packet attribute information is sent by an operation support system (OSS) of an operator to the controller 201. The controller 201 may receive the packet attribute information through a northbound interface (NBI) of the controller.

In the embodiment of this disclosure, the flow matching rule establishes a correspondence between the flow identification and the packet attribute information. The controller 201 maps the packet attribute information to the flow identification by using the flow matching rule. The flow identification is a packet classification mode, each flow identification is used to identify a corresponding packet flow, and the packet flow may include a plurality of packets having a same attribute. The flow identification may be referred to as a user-defined differentiated services code point (UD-DSCP), and may be specifically a character string of a specific length to provide an index for the packet attribute information. With reference to the foregoing description, the packet attribute information may include at least one of the following: the identification information of the application, the network performance requirement information of the application, the identification information of the user, the virtual local area network (VLAN) tag, the priority of the packet, or the differentiated services code point (DSCP) of the packet. When the packet attribute information changes in various combinations, the corresponding flow identification can be found according to the flow matching rule. Therefore, flow identifications represent different packet classifications, and provide a basis for differentiated services.

In an example, the packet attribute information includes at least the identification information of the application. In other words, the packet attribute information may be the identification information of the application, or may be a combination of one or more of the identification information of the application, the network performance requirement information of the application, the identification information of the user, the virtual local area network (VLAN) tag, the priority of the packet, or the differentiated services code point (DSCP) of the packet. Therefore, the flow identification reflects the application to which the packet belongs, so that application-based packet classification is implemented, and packet classification is more refined.

In an example, the flow matching rule may be pre-established by the controller 201. For example, the controller separately establishes correspondences between different packet attribute information or combinations of packet attribute information and different values. These correspondences are flow matching rules, and the values are flow identifications of corresponding packet attribute information or combinations of packet attribute information.

For example, the flow matching rule may take a form of a table. With reference to the application scenario shown in FIG. 1, the node S receives a packet. An APP ID carried in the packet may be an application ID, and identifies an application to which the packet belongs. A network performance requirement of the application carried in the packet is that a bandwidth >20 Mbit/s and a latency <1 ms, indicating that the network performance requirement of the application to which the packet belongs is that the bandwidth >20 Mbit/s and the latency <1 ms. If a user ID carried in the packet is Alice, a user to which the packet belongs is Alice. The node S obtains that the APP ID carried in the packet is the application ID, the network performance requirement of the application is that the bandwidth >20 Mbit/s and the latency <1 ms, and the user ID is Alice, and sends the three pieces of packet attribute information to the controller. The controller obtains the packet attribute information of the packet. The flow matching rule pre-established by the controller is shown in Table 1. The controller obtains, based on the packet attribute information and the flow matching rule, that the UD-DSCP is 10101001.

TABLE 1

| Packet attribute information | UD-DSCP |
| --- | --- |
| APP ID: application ID; Network performance requirement of application: bandwidth >20 Mbit/s and latency <1 ms; and User ID: Alice. | 10101001 |

S211: The controller 201 generates a first flow policy, where the first flow policy includes a correspondence between the flow identification and a first flow behavior.

In the embodiment of this disclosure, the flow behavior corresponds to the packet processing mode. For example, the flow behavior may include packet processing actions such as packet filtering, re-marking, redirection, traffic policing, or traffic statistics collection. The flow policy binds a specific flow identification to a specific flow behavior. If a packet includes the specific flow identification, the corresponding specific flow behavior is taken for the packet.

For example, the flow policy may take the form of the table. With reference to the application scenario shown in FIG. 1, the first flow policy is shown in Table 2. The first flow policy generated by the controller includes the UD-DSCP and the first flow behavior, where the UD-DSCP is 10101001, and the first flow behavior is traffic policing. Therefore, for a network device that receives the first flow policy, a function of the first flow policy is to perform traffic policing on a packet when the packet includes a flow identification 10101001.

TABLE 2

| UD-DSCP | First flow behavior |
| --- | --- |
| 10101001 | Traffic policing |

In an example, the controller 201 may generate a plurality of flow policies. For example, the controller 201 further generates a second flow policy, where the second flow policy includes a correspondence between the flow identification and a second flow behavior. For example, the second flow behavior and the first flow behavior may be different flow behaviors. That is, in different flow policies generated by the controller 201, a same flow identification may correspond to different flow behaviors. With reference to the application scenario shown in FIG. 1, the first flow policy is shown in Table 3. The second flow policy generated by the controller includes the UD-DSCP and the second flow behavior, where the UD-DSCP is 10101001, and the second flow behavior is redirecting to a traffic cleaning device. Therefore, for a network device that receives the second flow policy, a function of the second flow policy is to redirect the packet to the traffic cleaning device (not shown in the figure) when the packet includes the flow identification 10101001. The traffic cleaning device may be a bypass device connected to a firewall or another network device, and is configured to accurately identify abnormal traffic in a network, discard the abnormal traffic, and ensure that normal traffic passes. The traffic cleaning device may transmit the normal traffic back to the firewall or the another network device connected to the traffic cleaning device.

TABLE 3

| UD-DSCP | Second flow behavior |
|---|---|
| 10101001 | Redirect to a traffic cleaning device |

In an example, the controller 201 may generate a flow policy for a network ingress node. For example, the controller 201 further generates a third flow policy, where the third flow policy includes a correspondence between the flow identification and a third flow behavior. The third flow behavior may be some specific flow behaviors executed by the ingress node, for example, a re-marking behavior, used to indicate to the ingress node to place the UD-DSCP into a field in which an original DSCP is stored in the packet, and to overwrite the original DSCP. In a possible case, the third flow policy may also include a correspondence between the packet attribute information and the third flow behavior. That is, the ingress node may also obtain the third flow behavior from the third flow policy based on the packet attribute information, and process the packet in a corresponding processing mode. With reference to the application scenario shown in FIG. 1, the third flow policy is shown in Table 4. The third flow policy generated by the controller includes the UD-DSCP and the third flow behavior, where the UD-DSCP is 10101001, and the third flow behavior is re-marking. Therefore, for the ingress node that receives the third flow policy, a function of the third flow policy is that when the packet includes the flow identification 10101001, the flow identification is added to the field in which the original DSCP is stored in the packet, and overwrites the original DSCP.

TABLE 4

| UD-DSCP | Third flow behavior |
|---|---|
| 10101001 | Re-marking |

S212: The controller 201 determines a forwarding path of the packet including the packet attribute information. The network device 202 and the network device 203 are network devices on the forwarding path. That the controller 201 determines a forwarding path of the packet including the packet attribute information may mean that the controller 201 calculates the forwarding path used to forward the packet including the packet attribute information, or mean that the controller 201 finds, based on the path information, the forwarding path used to forward the packet including the packet attribute information from a plurality of forwarding paths stored in the controller.

In an example, the controller 201 calculates the forwarding path used to forward the packet including the packet attribute information. The controller 201 obtains the path information used to calculate the forwarding path, and calculates the forwarding path based on the path information. In one case, the path information is sent by the network ingress node to the controller 201. The ingress node obtains the path information from the packet and sends the path information to the controller 201. In another case, the path information is sent by the operation support system (OSS) of the operator to the controller 201. The controller 201 may receive the path information through the northbound interface (NBI) of the controller. The path information may include a destination address. For example, the destination address may be a destination address of the packet, that is, an address of a network device that actually receives the packet. Alternatively, the destination address may be an address of an edge node of the SR network, that is, a tail node of a forwarding path for forwarding a packet in the SR network. The path information may also include a source address. For example, the source address may be an address for actually sending the packet, for example, a terminal device. Alternatively, the source address may be the address of the edge node of the SR network, that is, a head node of the forwarding path for forwarding the packet in the SR network. The path information may also include the network performance requirement information. The network performance requirement information may be represented as one or more pieces of information such as bandwidth, latency, jitter, packet loss, reliability, and security. The network performance requirement information used as the path information may be included in the packet, or may be determined based on information in the packet. For example, the ingress node of the forwarding path determines the network performance requirement information based on the destination address of the packet, and sends the network performance requirement information to the controller as the path information. In this case, the ingress node of the forwarding path may store a correspondence between the destination address of the packet and the network performance requirement information.

In an example, after calculating the forwarding path used to forward the packet including the packet attribute information, the controller 201 generates the segment identification list corresponding to the forwarding path. The segment identification list includes a segment identification of a network device on the forwarding path. Optionally, the segment identification of the network device may be a node segment identification of the network device, or may be an adjacent segment identification of the network device, or may be a combination of a node segment identification of the network device and an adjacent segment identification of the network device.

In an example, the controller 201 searches for the forwarding path used to forward the packet including the packet attribute information. The controller 201 already stores the plurality of forwarding paths. The controller 201 obtains path information used to determine the forwarding path, and finds the forwarding path from the plurality of forwarding paths based on the path information. The path information may be the same as the path information used to calculate the forwarding path.

In an example, the forwarding path is already used for the packet including the packet attribute information, and the controller 201 finds, based on the path information, the forwarding path from the plurality of forwarding paths stored in the controller. The path information may be the same as the path information used to calculate the forwarding path.

In an example, after finding the forwarding path used to forward the packet including the packet attribute information, the controller 201 further selects the segment identification list corresponding to the forwarding path. The segment identification list includes the segment identification of the network device on the forwarding path.

An example is used for description with reference to the application scenario shown in FIG. 1. A packet 1 arrives at a network ingress node S, and the destination address of the packet is the edge node of the SR network, for example, the node E. The network performance requirement is that the bandwidth >20 Mbit/s and the latency <1 ms. The node S sends the destination address and the network performance requirement to the controller as the path information. The controller calculates a forwarding path used to forward the packet 1. The forwarding path is successively passing through the node A, the node B, the node C, the node D, and the node E. In addition, the controller generates a segment identification list corresponding to the forwarding path. The segment identification list maybe, for example, [1001, 1002, 1003, 1004, 1005], where 1001, 1002, 1003, 1004, and 1005 are respectively segment identifications of the node A, the node B, the node C, the node D, and the node E.

S213: The controller 201 sends the flow matching rule to the network device 202. The flow matching rule is used to indicate to the network device 202 to add the flow identification to the packet including the packet attribute information. The network device 202 may be the ingress node of the forwarding path used to forward the packet.

In an example, the controller 201 sends a first control packet to the network device 202. The first control packet includes the flow matching rule.

In an example, the controller 201 further sends a correspondence between the path information and the segment identification list of the forwarding path to the network device 202. The correspondence between the path information and the segment identification list may be sent together with the flow matching rule, or may be sent separately from the flow matching rule. The correspondence between the path information and the segment identification list is used to indicate to forward a packet including the path information along the forwarding path. With reference to the application scenario shown in FIG. 1, the correspondence between the path information and the segment identification list is shown in Table 5. The path information includes the destination address of the packet, namely, the node E, and the network performance requirement, that is, the bandwidth >20 Mbit/s and the latency <1 ms. The corresponding segment identification list is [1001, 1002, 1003, 1004, 1005], where 1001, 1002, 1003, 1004, and 1005 are respectively segment identifications of the node A, the node B, the node C, the node D, and the node E, that is, the forwarding path is passing through the node A, the node B, the node C, and the node D to the node E.

TABLE 5

| Path information | Segment identification list |
| --- | --- |
| Destination address: node E; Network performance requirement: bandwidth >20 Mbit/s and latency <1 ms | [1001, 1002, 1003, 1004, 1005] |

S214: The controller 201 sends the first flow policy to the network device 203. The first flow policy includes the correspondence between the flow identification and the first flow behavior. The first flow policy is used to indicate to the network device 203 to process, in a packet processing mode corresponding to the first flow behavior, the packet including the flow identification.

In an example, the controller 201 sends a second control packet to the network device 203. The second control packet includes the first flow policy. With reference to the application scenario shown in FIG. 1, the network device 203 may be the node B. The controller sends the second control packet to the node B. The second control packet includes the first flow policy, and the first flow policy includes the correspondence between the flow identification and the first flow behavior.

In an example, the controller 201 further sends the second flow policy to the network device 203. The second flow policy includes the correspondence between the flow identification and the second flow behavior. The second flow policy is used to indicate to the network device 203 to process, in a packet processing mode corresponding to the second flow behavior, the packet including the flow identification. The second flow behavior is different from the first flow behavior. In other words, the controller 201 may send two or more different flow policies to the network device 203. Optionally, the controller 201 simultaneously sends the first flow policy and the second flow policy. Optionally, the controller 201 separately sends the first flow policy and the second flow policy. With reference to the application scenario shown in FIG. 1, the second control packet sent by the controller to the node B further includes the second flow policy, and the second flow policy includes the correspondence between the flow identification and the second flow behavior. The second flow policy is used to indicate to the node B to process, in the packet processing mode corresponding to the second flow behavior, the packet including the flow identification.

In an example, the controller 201 may further send the second flow policy to another network device (not shown in FIG. 2A-1) on the forwarding path. The second flow policy includes the correspondence between the flow identification and the second flow behavior. The second flow policy is used to indicate to the network device 203 to process, in a packet processing mode corresponding to the second flow behavior, the packet including the flow identification. The second flow behavior is different from the first flow behavior. In other words, the controller 201 may separately send different flow policies to two or more different nodes on the forwarding path. Optionally, the controller 201 simultaneously sends the first flow policy and the second flow policy. Optionally, the controller 201 separately sends the first flow policy and the second flow policy. With reference to the application scenario shown in FIG. 1, the controller may further send a third control packet to the node D. The third control packet includes the second flow policy, and the second flow policy includes the correspondence between the flow identification and the second flow behavior. The second flow policy is used to indicate to the node D to process, in the packet processing mode corresponding to the second flow behavior, the packet including the flow identification.

S215: The network device 202 receives the flow matching rule.

In an example, the network device 202 further receives the segment identification list corresponding to the forwarding path from the controller 201. The segment identification list includes the segment identification of the network device on the forwarding path.

For example, the network device 202 may store, inside the device, the flow matching rule and the segment identification list that are received from the controller 201.

S216: The network device 202 receives the packet including the packet attribute information.

In the embodiment of this disclosure, the packet attribute information is included in the packet, that is, the packet attribute information is included in an SRv6 packet. For example, the identification information of the application, the network performance requirement information of the application, and the identification information of the user may be included in an SRH of the SRv6 packet, and the VLAN tag, the priority of the packet, and the DSCP of the packet may be included in a header.

S217: The network device 202 obtains the flow identification based on the packet attribute information and the flow matching rule. The network device 202 obtains the packet attribute information from the packet, and performs matching in the flow matching rule based on the packet attribute information, to obtain a corresponding flow identification. In the embodiment of this disclosure, the flow matching rule in the controller is the same as the flow matching rule at the ingress node of the forwarding path, so that the controller and the ingress node of the forwarding path use a same packet classification mode.

With reference to the application scenario shown in FIG. 1, the network device 202 may be the node S. That the controller obtains the packet attribute information in the packet includes: the APP ID is the ID of the application, the network performance requirement of the application is the bandwidth >20 Mbit/s and the latency <1 ms, and the user ID is Alice. The controller obtains that the UD-DSCP corresponding to the packet attribute information is 10101001 by using a flow classification matching rule. The controller sends the flow classification rule shown in Table 1 to the node S. The node S receives the flow matching rule from the controller. When receiving the packet including the packet attribute information, the node S matches the flow classification matching rule by using the packet attribute information in the packet as an index, and when the matching succeeds, determines that a flow classification identification corresponding to the packet is 10101001. The matching the flow classification matching rule by using the packet attribute information in the packet as an index specifically includes comparing the packet attribute information of the packet with the packet attribute information in the flow classification matching rule, and if the packet attribute information of the packet is the same as the packet attribute information in the flow classification matching rule, the matching succeeds.

S218: The network device 202 adds the flow identification to the packet. For example, the network device 202 adds the flow identification to the SRH of the SRv6 packet.

Figure 2B:
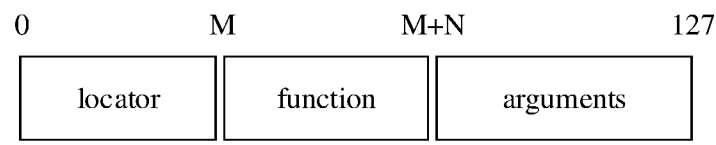
FIG. 2B is a schematic diagram of a format of a segment identification according to an embodiment of this disclosure.

In an example, the flow identification may be added to a segment identification (SID) of a segment identification list (SID list) in the SRH, and further, the segment identification list including the flow identification is encapsulated into the SRv6 packet. A format of the SID including the flow identification is shown in FIG. 2B. The SID format includes a locator field, a function field, and an argument field. For example, a length of the SID may be 128 bits. A length of the locator field is M+1 bits, a length of the function field is N bits, and a length of the argument field is 129−M−N bits, where M and N are positive integers, and M+N is less than 129. The argument field is used to store the UD-DSCP, the function field carries a read identification END.UD-DSCP, and the read identification is used to indicate to read the UD-DSCP in the argument field of the SID, and then search for the corresponding flow behavior in the flow policy based on the read UD-DSCP.

In an example, the network device 202 may determine nodes that need to perform packet processing on the forwarding path, and add the flow identification only to segment identifications of these nodes. For example, the network device 202 receives a control packet sent by the controller 201, and learns, from the control packet, the nodes that need to perform packet processing on the forwarding path. Correspondingly, the controller 201 sends the flow policy to the nodes that need to perform packet processing on the forwarding path. With reference to the application scenario shown in FIG. 1, the network device 202 may be the node S. The forwarding path is successively passing through the node A, the node B, the node C, the node D, and the node E. The node B is the firewall, and needs to perform traffic monitoring. The node D is an aggregation node, has a higher congestion possibility, and needs to schedule a packet with a high priority. Therefore, the node B and the node D need to perform packet processing. The controller sends identification information of the node B and the node D to the node S. For example, the identification information of the node B and the node D may be segment identifications of the node B and the node D. The node S adds the flow identification to the segment identifications of the node B and the node D in the segment identification list. The controller also separately sends the flow policy to the node B and the node D. For example, the controller sends the first flow policy shown in Table 2 to the node B, and sends the second flow policy shown in Table 3 to the node D.

In an example, the flow identification may be added to a TLV field of the SRH of the SRv6 packet. A type T in the TLV field defines a type of a TLV. In the embodiment of this disclosure, the type of the TLV is a TLV that carries the flow identification. A length L in the TLV field indicates a length of a value V in the TLV. The value V in the TLV field is the flow identification. A length of the TLV value may be 128 bits. For example, the TLV field may also include only the flow identification, but does not include other information. For example, a format of the TLV value may be the format of the SID including the flow identification.

In an example, the flow identification may be added to a TC field of the SRH of the SRv6 packet. For example, the flow identification may overwrite an original DSCP value of the packet.

S219: The network device 202 sends the packet including the flow identification to the network device 203. For example, the network device 202 determines the forwarding path used to forward the packet, and sends the packet along the forwarding path. That the network device 202 determines the forwarding path used to forward the packet may mean that the network device 202 receives the correspondence between the path information and the segment identification list from the controller, and determines, based on the path information, the segment identification list corresponding to the forwarding path.

With reference to the application scenario shown in FIG. 1, the ingress node S receives, from the controller, the correspondence between the path information and the segment identification list shown in Table 4. When receiving the packet, the ingress node obtains the path information of the packet, including that the destination address is the node E, and the network performance requirement is that the bandwidth >20 Mbit/s and the latency <1 ms, and further determines that the corresponding segment identification list is [1001, 1002, 1003, 1004, 1005], that is, the forwarding path is passing through the node A, the node B, the node C, and the node D to the node E.

In an example, that the network device 202 sends the packet including the flow identification to the network device 203 may mean that the packet is sent by the network device 202, forwarded by several other network devices, and finally arrives at the network device 203. For example, the packet is sent by the node S, forwarded by the node A, and arrives at the node B. In addition, the network device 202 and the network device 203 may also be directly connected, that is, there is no other node between the network device 202 and the network device 203.

S220: The network device 203 receives the first flow policy. For example, the network device 203 may receive the flow matching rule from the controller 201 and store the first flow policy.

S221: The network device 203 receives the packet including the flow identification, and obtains the flow identification from the packet.

In an example, the network device 203 obtains the segment identification from a DA field in the header of the packet. The segment identification is a segment identification of the network device 203. A previous-hop node of the network device 203 on the forwarding path obtains the segment identification of the network device 203 from the segment identification list of the packet, puts the segment identification into the DA field in the header of the packet, and sends the packet along the forwarding path. The packet arrives at the network device 203. The network device 203 obtains the read identification from the function field of the segment identification, and obtains the flow identification from the argument field of the segment identification based on the read identification. The previous-hop node of the network device 203 on the forwarding path may be the ingress node of the forwarding path, or the previous-hop node of the network device 203 on the forwarding path may be an intermediate node of the forwarding path.

In an example, the network device 203 obtains the flow identification from the TLV of the SRH of the packet.

In an example, the network device 203 obtains the flow identification from the TC field in the header of the packet.

With reference to the application scenario shown in FIG. 1, the network device 203 may be the node B, and the node B is the firewall. The node B receives the first flow policy shown in Table 2. The packet including the flow identification is sent by the node S, forwarded by the node A, and arrives at the node B. When the packet arrives at the node A, the node A finds, based on a segments left (SL) field in the SRH of the packet, a segment identification that needs to be processed, that is, the segment identification of the node B. The node A places the segment identification of the node B into the DA field in the header of the packet, and sends the packet. The node B receives the packet, and obtains the segment identification from the DA field in the header of the packet. The segment identification is the segment identification of the node B. The node B obtains the END.UD-DSCP from the function field of the segment identification, and obtains, from the argument field of the SID based on the END.UD-DSCP, that the UD-DSCP is 10101001.

S222: The network device 203 obtains the first flow behavior from the first flow policy based on the flow identification.

S223: The network device 203 processes the packet in the packet processing mode corresponding to the flow behavior.

In an example, the network device 203 no longer processes the packet in a packet processing mode corresponding to another QoS guarantee mode. For example, the network device 203 no longer processes the packet in a packet processing mode corresponding to a PHB of the original DSCP.

With reference to the application scenario shown in FIG. 1, the network device 203 may be the node B, and the node B is the firewall. The node B obtains, based on that the UD-DSCP is 10101001, the first flow behavior from the first flow policy shown in Table 2, that is, traffic monitoring. The node B processes the packet in a packet processing mode corresponding to the traffic monitoring.

In an example, for the controller 201, the step of sending the flow matching rule to the network device 202 and the step of sending the first flow policy to the network device 203 may be performed in any sequence. For example, the flow matching rule may be first sent to the network device 202, or the first flow policy may be first sent to the network device 203, or the first flow policy may be sent to the network device 203 when the flow matching rule is sent to the network device 202. Refer to FIG. 2A-1. S213 and S214 may be performed in any sequence.

Figure 3A:
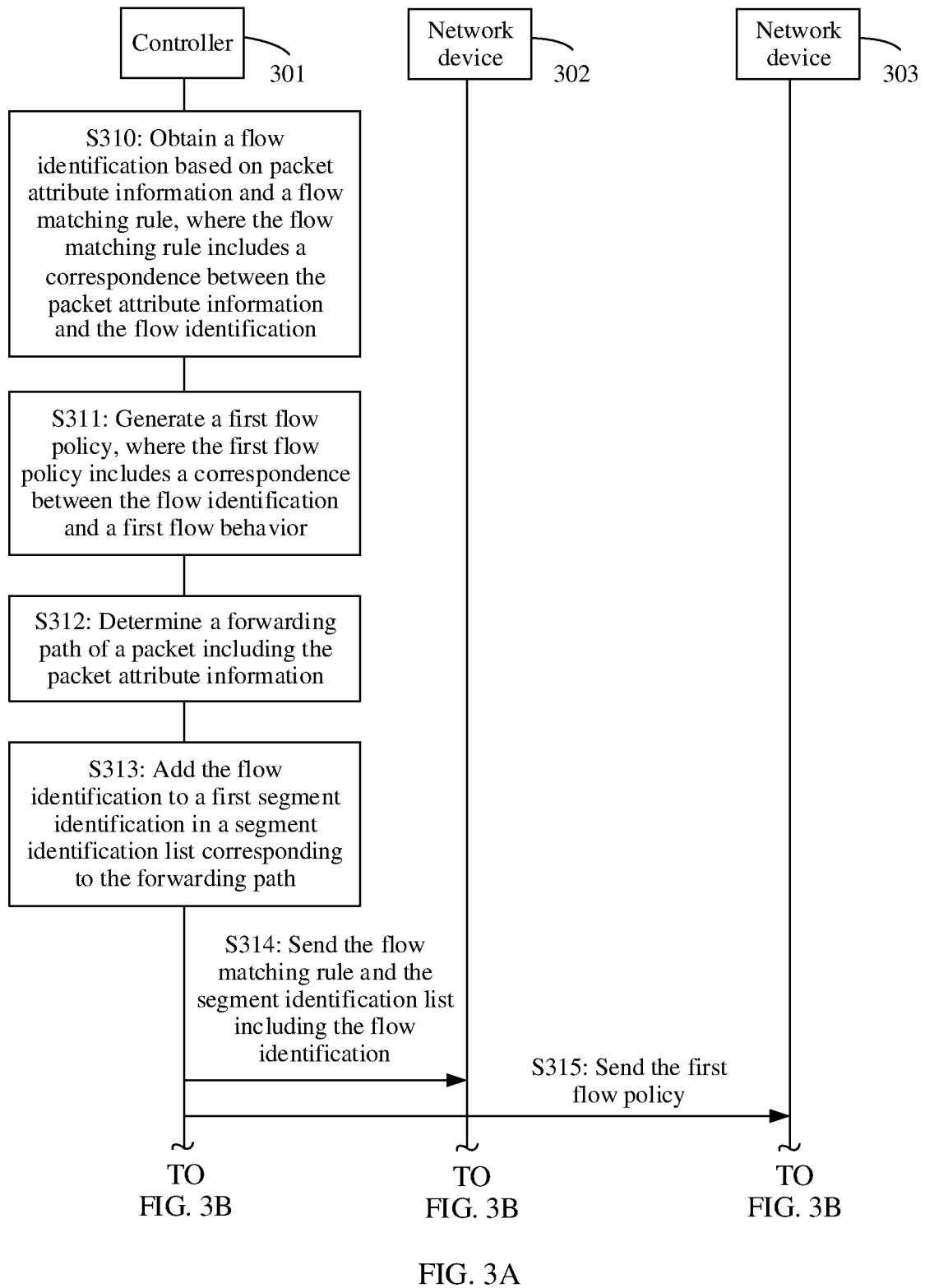
FIG. 3A and FIG. 3B are a schematic flowchart of a packet processing method according to an embodiment of this disclosure.
Figure 3B:
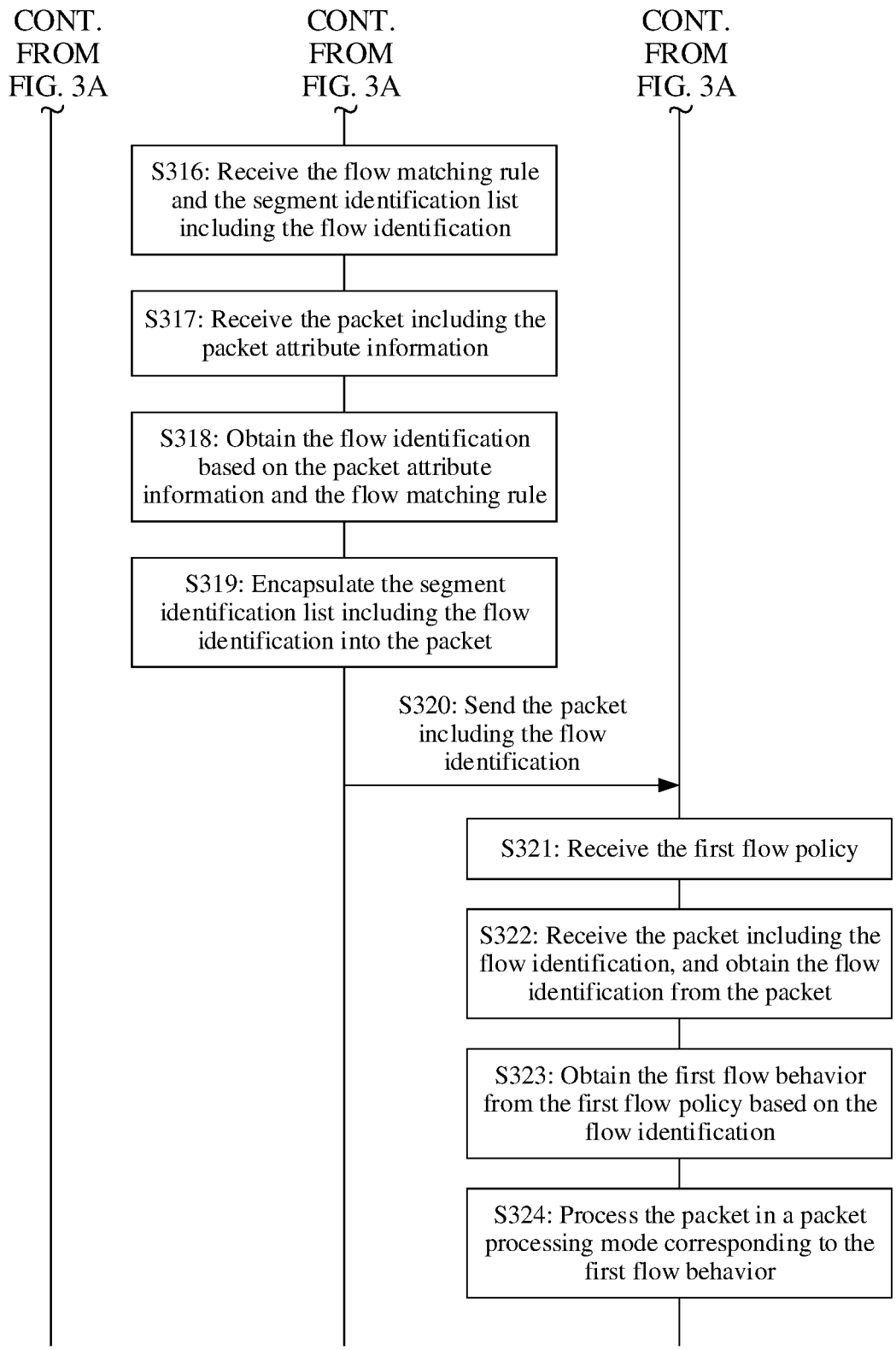

Refer to FIG. 3A and FIG. 3B. An embodiment of this disclosure provides a packet processing method. In the method, a controller adds a flow identification to a segment identification of a segment identification list and sends the segment identification to an ingress node of a forwarding path. The ingress node encapsulates the segment identification list including the flow identification into the packet and sends the packet. A node other than the ingress node on the forwarding path obtains the flow identification by parsing the segment identification of the node, and processes the packet. Compared with the ingress node adding the flow identification to the segment identification list, this method simplifies a packet processing process of the ingress node. With reference to the application scenario shown in FIG. 1, a controller 301 is a controller in the SR network. A network device 302 may be the ingress node of the network, for example, the node S. A network device 303 may be a network device in the SR network, for example, the node A, the node B, the node C, the node D, or the node E. The method includes:

S310: The controller 301 obtains the flow identification based on packet attribute information and a flow matching rule.

S311: The controller 301 generates a first flow policy, where the first flow policy includes a correspondence between the flow identification and a first flow behavior.

S312: The controller 301 determines a forwarding path used to forward a packet including the packet attribute information. The forwarding path includes the network device 302 and the network device 303.

Specific processes of steps S310, S311, and S312 are similar to steps S210, S211, and S212 in the embodiment shown in FIG. 2A-1, and similarities are not described again.

S313: The controller 301 adds the flow identification to a first segment identification in the segment identification list corresponding to the forwarding path. The first segment identification is a segment identification of the network device 303.

In an example, a format of the segment identification of the network device 303 may be the format of the SID that includes the flow identification and that is described in step S218. As shown in FIG. 2B, the SID format includes the locator field, the function field, and the argument field. The argument field is used to store a UD-DSCP, the function field carries a read identification END.UD-DSCP, and the read identification is used to indicate to read the UD-DSCP in the flow identification and the segment identification list is shown in Table 6. The path information includes a destination address of the packet, namely, the node E, and a network performance requirement, that is, a bandwidth >20 Mbit/s and a latency <1 ms. The flow identification is 10101001, and the corresponding segment identification list is [1001, 1002 (10101001), 1003, 1004, 1005], that is, the forwarding path is passing through the node A, the node B, the node C, and the node D to the node E.

TABLE 6

| Combination of path information and flow identification | Segment identification list |
| --- | --- |
| Destination address: node E;<br>Network performance requirement:<br>bandwidth >20 Mbit/s and latency <1 ms<br>UD-DSCP: 10101001 | [1001, 1002 (10101001), 1003, 1004, 1005] | argument field of the SID, and then search for a corresponding flow behavior in a flow policy based on the read UD-DSCP.

In an example, the controller 301 may determine nodes that need to perform packet processing on the forwarding path, and add the flow identification only to segment identifications of these nodes. Correspondingly, the controller 301 sends the flow policy to the nodes that need to perform packet processing on the forwarding path. With reference to the application scenario shown in FIG. 1, the forwarding path is successively passing through the node A, the node B, the node C, the node D, and the node E. The node B is a firewall, and needs to perform traffic monitoring. The node D is an aggregation node, has a higher congestion possibility, and needs to schedule a packet with a high priority. Therefore, the node B and the node D need to perform packet processing. The controller adds the flow identification to segment identifications of the node B and the node D in the segment identification list, and separately sends the flow policy to the node B and the node D. For example, the controller sends the first flow policy shown in Table 2 to the node B, and sends the second flow policy shown in Table 3 to the node D.

S314: The controller 301 sends, to the network device 302, a flow classification matching rule and a correspondence between a combination of path information and the flow identification and the segment identification list including the flow identification. The flow matching rule is used to indicate to the network device 302 to add the segment identification list including the flow identification to the packet including the packet attribute information. The network device 302 may be the ingress node of the forwarding path used to forward the packet.

The correspondence between the combination of the path information and the flow identification and the segment identification list including the flow identification may be sent together with the flow matching rule, or may be sent separately from the flow matching rule. The correspondence between the combination of the path information and the flow identification and the segment identification list including the flow identification is used to indicate to forward a packet including the path information and the packet attribute information along the forwarding path corresponding to the segment identification list. With reference to the application scenario shown in FIG. 1, the correspondence between the combination of the path information and the In an example, the controller 301 sends a first control packet to the network device 302. The first control packet includes the flow matching rule.

S315: The controller 301 sends the first flow policy to the network device 303. The first flow policy is used to indicate to the network device 303 to process, in a packet processing mode corresponding to the first flow behavior, the packet including the flow identification.

A specific process of step S315 is similar to step S214 in the embodiment shown in FIG. 2A-1, and similarities are not described again.

S316: The network device 302 receives the flow matching rule and the correspondence between the combination of the path information and the flow identification and the segment identification list including the flow identification.

S317: The network device 302 receives the packet including the packet attribute information.

S318: The network device 302 obtains the flow identification based on the flow matching rule and the packet attribute information.

Specific processes of steps S317 and S318 are similar to steps S216 and S217 in the embodiment shown in FIG. 2A-2, and similarities are not described again.

S319: The network device 302 encapsulates the segment identification list including the flow identification into the packet. The network device 302 determines, based on the obtained flow identification and with reference to the path information, the segment identification list including the flow identification, and encapsulates the segment identification list including the flow identification into the packet. With reference to the application scenario shown in FIG. 1, the ingress node S receives, from the controller, the flow matching rule shown in Table 1, and the correspondence between the combination of the path information and the flow identification and the segment identification list shown in Table 5. When receiving the packet, the ingress node obtains, based on the packet attribute information in the packet and the flow matching rule, that the UD-DSCP is 10101001. The ingress node obtains the path information of the packet, including that the destination address is the node E, and the network performance requirement is that the bandwidth >20 Mbit/s and the latency <1 ms. The ingress node obtains, from Table 5 based on the combination of the flow identification and the path information, that the corresponding segment identification list is [1001, 1002 (10101001), 1003, 1004, 1005], that is, the forwarding path is passing through the node A, the node B, the node C, and the node D to the node E, and encapsulates the segment identification list into the packet.

S320: The network device 302 sends the packet including the flow identification to the network device 303. That the network device 302 sends the packet including the flow identification to the network device 303 may mean that the network device 302 sends the packet including a segment list to the network device 303. The segment identification list includes the flow identification. For example, the network device 302 determines the forwarding path used to forward the packet, and sends the packet including the segment identification list along the forwarding path. The segment identification list includes the flow identification. That the network device 302 determines the forwarding path used to forward the packet may mean that the network device 302 determines, based on the combination of the path information and the flow identification, the segment identification list corresponding to the forwarding path. The segment identification list includes the flow identification.

S321: The network device 303 receives the first flow policy.

For a specific process of step S321, refer to descriptions of step S220 in the embodiment shown in FIG. 2A-2, and similarities are not described again.

S322: The network device 303 receives the packet including the flow identification, and obtains the flow identification from the packet. For example, the network device 303 obtains the segment identification from a DA field in a header of the packet. The segment identification is a segment identification of the network device 303. A previous-hop node of the network device 303 on the forwarding path obtains the segment identification of the network device 303 from the segment identification list of the packet, puts the segment identification into the DA field in the header of the packet, and sends the packet along the forwarding path. The packet arrives at the network device 303. The network device 303 obtains the read identification from the function field of the segment identification, and obtains the flow identification from the argument field of the segment identification based on the read identification. The previous-hop node of the network device 303 on the forwarding path may be the ingress node of the forwarding path, or the previous-hop node of the network device 303 on the forwarding path may be an intermediate node of the forwarding path.

S323: The network device 303 obtains the first flow behavior from the first flow policy based on the flow identification.

S324: The network device 303 processes the packet in the packet processing mode corresponding to the first flow behavior.

Specific processes of steps S323 and S324 are similar to steps S222 and S223 in the embodiment shown in FIG. 2A-2, and similarities are not described again.

In an example, for the controller 301, the step of adding the flow identification to the first segment identification of the segment identification list corresponding to the forwarding path and the step of generating the first flow policy may be performed in any sequence. For example, the flow identification may be first added to the first segment identification of the segment identification list corresponding to the forwarding path, or the first flow policy is generated, or the first flow policy is generated when the flow identification is added to the first segment identification of the segment identification list corresponding to the forwarding path. Refer to FIG. 3A. S312 and S313 may be performed in any sequence.

Figure 4:
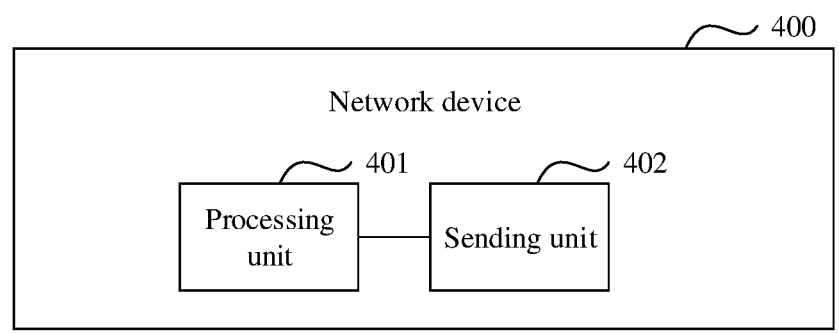
FIG. 4 is a schematic structural diagram of a network device according to an embodiment of this disclosure.

FIG. 4 is a possible schematic structural diagram of the network device in the foregoing embodiment. The network device 400 may implement a function of the controller 201 in the embodiment shown in FIG. 2A-1 or the controller 301 in the embodiment shown in FIG. 3A. Refer to FIG. 4. The network device 400 includes a processing unit 401 and a sending unit 402. These units may perform corresponding functions of the network device in the foregoing method embodiment. For example, the processing unit 401 is configured to: obtain a flow identification based on packet attribute information and a flow matching rule, where the flow matching rule includes a correspondence between the packet attribute information and the flow identification, and the flow identification is used to identify a packet including the packet attribute information; generate a first flow policy, where the first flow policy includes a correspondence between the flow identification and a first flow behavior; and determine a forwarding path used to forward the packet including the packet attribute information; and the sending unit 402 is configured to: send the flow matching rule to an ingress device of the forwarding path, where the flow matching rule is used to indicate to the ingress device to add the flow identification to the packet including the packet attribute information; and send the first flow policy to a first network device, where the first flow policy is used to indicate to the first network device to process, in a packet processing mode corresponding to the first flow behavior, the packet including the flow identification.

Figure 5:
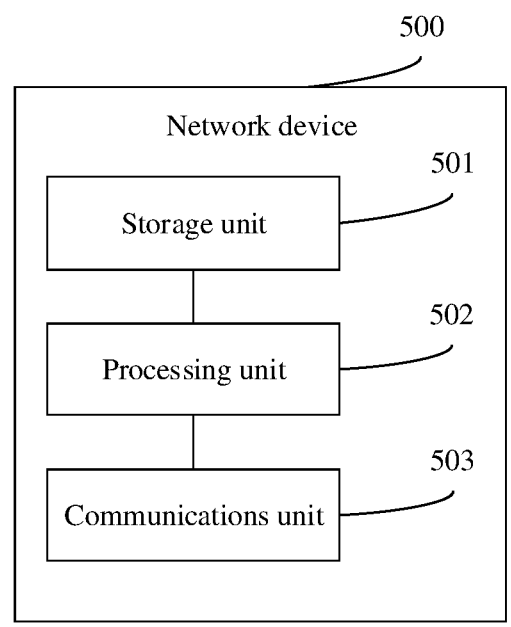
FIG. 5 is a schematic structural diagram of a network device according to an embodiment of this disclosure.

When an integrated unit is used, FIG. 5 is another possible schematic structural diagram of the network device in the foregoing embodiment. The network device 500 may implement a function of the controller 201 in the embodiment shown in FIG. 2A-1 or the controller 301 in the embodiment shown in FIG. 3A.

The network device 500 includes: a storage unit 501, a processing unit 502, and a communications unit 503. The processing unit 502 is configured to control and manage an action of the network device 500. For example, the processing unit 502 is configured to support the network device 500 in performing processes S210, S211, S212, S213, and S214 in FIG. 2A-1, processes S310, S311, S312, S313, S314, and S315 in FIG. 3A, and/or another process used in the technology described in this specification. The communications unit 503 is configured to support communication between the network device 500 and another network entity, for example, communication with the network devices 202 and 203 in the embodiment shown in FIG. 2A-1 and FIG. 2A-2 or communication with the network devices 302 and 303 in the embodiment shown in FIG. 3B. The storage unit 501 is configured to store program code and data of the network device 500.

The processing unit 502 may be a processor, for example, may be a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processor may implement or execute various example logical blocks, modules, and circuits described with reference to content disclosed in the embodiments of the present invention. The processor may alternatively be a combination of processors implementing a computing function, for example, a combination of one or more microprocessors, or a combination of the DSP and a microprocessor. The communications unit 503 may be a network interface, and the storage unit 501 may be a memory.

Figure 6:
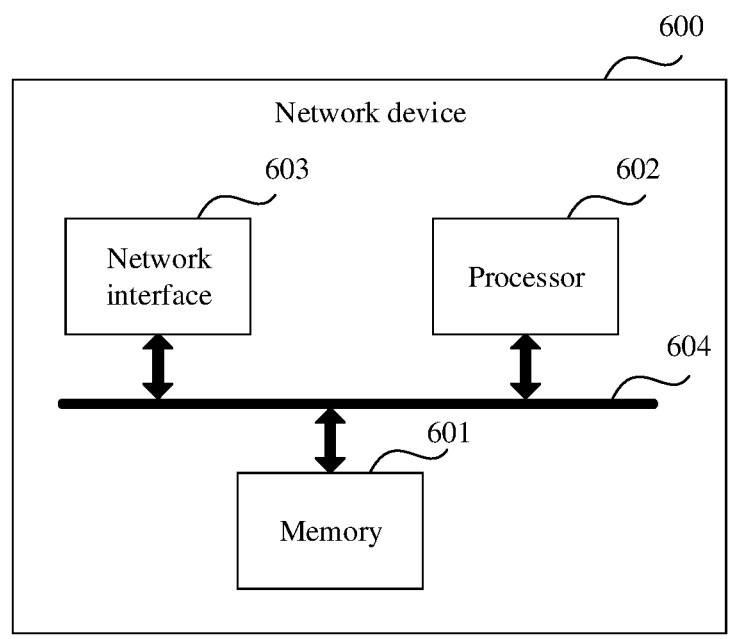
FIG. 6 is a schematic structural diagram of a network device according to an embodiment of this disclosure.

When the processing unit 502 is the processor, the communications unit 503 is the network interface, and the storage unit 501 is the memory, the network device in the embodiments of this disclosure may be a network device 600 shown in FIG. 6.

FIG. 6 is another possible schematic structural diagram of the network device in the foregoing embodiment. The network device 600 includes: a processor 602, a network interface 603, a memory 601, and a bus 604.

The memory 601 is configured to store instructions. When the embodiment shown in FIG. 4 is implemented and the units described in the embodiment in FIG. 4 are implemented by using software, software or program code required for performing a function of the processing unit 401 in FIG. 4 is stored in the memory 601.

The processor 602 is configured to execute the instructions in the memory 601, to perform the foregoing packet processing method applied to the embodiment shown in FIG. 2A-1 and FIG. 2A-2 or FIG. 3A and FIG. 3B.

The network interface 603 is configured to communicate with another network device. The network interface 603 may be an Ethernet interface, an asynchronous transfer mode (ATM) interface, or the like.

The network interface 603, the processor 602, and the memory 601 are interconnected through the bus 604. The bus 604 may be a peripheral component interconnect (PCI for short) bus, an extended industry standard architecture (EISA for short) bus, or the like. The bus may be classified into an address bus, a data bus, a control bus, and the like. For ease of representation, only one thick line is used to represent the bus in FIG. 6, but this does not mean that there is only one bus or only one type of bus.

In a specific embodiment, the processor 602 is configured to: obtain a flow identification based on packet attribute information and a flow matching rule, where the flow matching rule includes a correspondence between the packet attribute information and the flow identification, and the flow identification is used to identify a packet including the packet attribute information; generate a first flow policy, where the first flow policy includes a correspondence between the flow identification and a first flow behavior; determine a forwarding path of the packet including the packet attribute information; send the flow matching rule to an ingress device of the forwarding path, to indicate to the ingress device to add the flow identification to the packet including the packet attribute information; and send the first flow policy to the first network device on the forwarding path, to indicate to the first network device to process, in a packet processing mode corresponding to the first flow behavior, the packet including the flow identification. For a detailed processing process of the processor 602, refer to the detailed descriptions of the processes S210, S211, and S212 in the embodiment shown in FIG. 2A-1, and the processes S310, S311, S312, and S313 in the embodiment shown in FIG. 3A. Details are not described herein again.

The network interface 603 is used by the network device 600 to send the flow matching rule, the segment identification list, and a flow policy through a network system. For a specific process, refer to the detailed descriptions of S213 and S214 in the embodiment shown in FIG. 2A-1, and S314 and S315 in the embodiment shown in FIG. 3A. Details are not described herein again.

Figure 7:
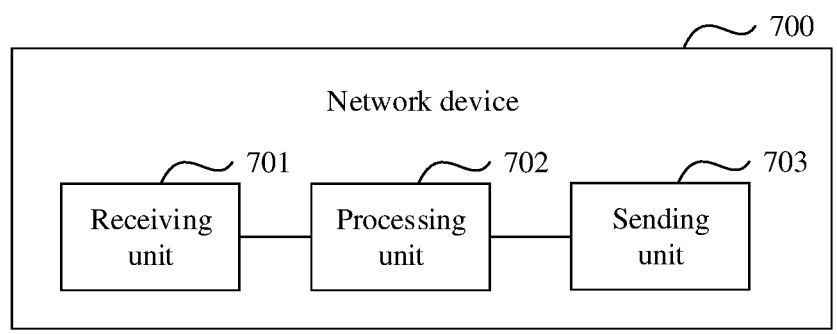
FIG. 7 is a schematic structural diagram of a network device according to an embodiment of this disclosure.

FIG. 7 is a possible schematic structural diagram of the network device in the foregoing embodiment. The network device 700 may implement a function of the network device 202 in the embodiment shown in FIG. 2A-1 and FIG. 2A-2 or the network device 302 in the embodiment shown in FIG. 3B. Refer to FIG. 7. The network device 700 includes: a receiving unit 701, a processing unit 702, and a sending unit 703. These units may perform corresponding functions of the network device in the foregoing method embodiment. For example, the receiving unit 701 is configured to: receive a flow matching rule sent by a controller, where the flow matching rule includes a correspondence between packet attribute information and a flow identification; and receive a packet including the packet attribute information;

the processing unit 702 is configured to: obtain the flow identification based on the packet attribute information and the flow matching rule, add the flow identification to the packet; and determine a forwarding path used to forward the packet; and the sending unit 703 is configured to forward the packet including the flow identification along the forwarding path.

Figure 8:
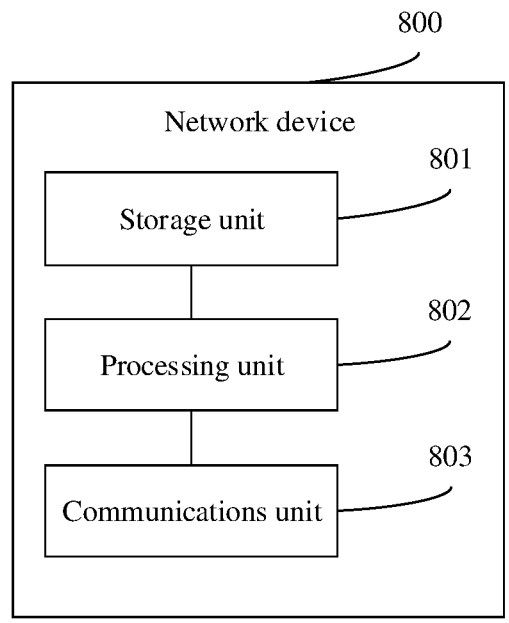
FIG. 8 is a schematic structural diagram of a network device according to an embodiment of this disclosure.

When an integrated unit is used, FIG. 8 is another possible schematic structural diagram of the network device in the foregoing embodiment. The network device 800 may implement a function of the network device 202 in the embodiment shown in FIG. 2A-1 and FIG. 2A-2 or the network device 302 in the embodiment shown in FIG. 3B.

The network device 800 includes: a storage unit 801, a processing unit 802, and a communications unit 803. The processing unit 802 is configured to control and manage an action of the network device 800. For example, the processing unit 802 is configured to support the network device 800 in performing processes S215, S216, S217, S218, and S219 in FIG. 2A-1 and FIG. 2A-2, processes S316, S317, S318, S319, and S320 in FIG. 3B, and/or another process used in the technology described in this specification. The communications unit 803 is configured to support communication between the network device 800 and another network entity, for example, communication with the controller 201 and the network device 203 in the embodiment shown in FIG. 2A-1 and FIG. 2A-2 or communication with the controller 301 and the network device 303 in the embodiment shown in FIG. 3A and FIG. 3B. The storage unit 801 is configured to store program code and data of the network device 800.

The processing unit 802 may be a processor, for example, may be a CPU, a general-purpose processor, a DSP, an ASIC, an FPGA, or another programmable logic device, a transistor logic device, a hardware component, or any combination thereof. The processor may implement or execute various example logical blocks, modules, and circuits described with reference to content disclosed in the embodiments of the present invention. The processor may alternatively be a combination of processors implementing a computing function, for example, a combination of one or more microprocessors, or a combination of the DSP and a microprocessor. The communications unit 803 may be a network interface. The storage unit 801 may be a memory.

Figure 9:
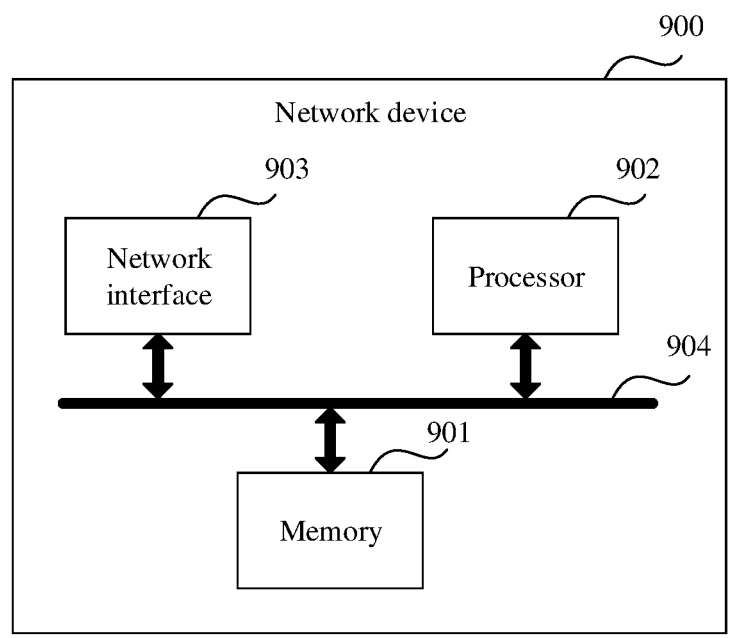
FIG. 9 is a schematic structural diagram of a network device according to an embodiment of this disclosure.

When the processing unit 802 is the processor, the communications unit 803 is the network interface, and the storage unit 801 is the memory, the network device in the embodiments of the present invention may be a network device 900 shown in FIG. 9.

FIG. 9 is a possible schematic structural diagram of the network device in the foregoing embodiment. The network node 900 includes: a processor 902, a network interface 903, a memory 901, and a bus 904.

The memory 901 is configured to store instructions. When the embodiment shown in FIG. 7 is implemented and the units described in the embodiment in FIG. 7 are implemented by using software, software or program code required for performing a function of the receiving unit 701, the processing unit 702, and the sending unit 703 in FIG. 7 is stored in the memory 901.

The processor 902 is configured to execute the instructions in the memory 901, to perform the foregoing packet processing method applied to the embodiment shown in FIG. 2A-1 and FIG. 2A-2 or FIG. 3A and FIG. 3B.

The network interface 903 is configured to communicate with another network device. The network interface 903 may be an Ethernet interface, an asynchronous transfer mode (ATM) interface, or the like.

The network interface 903, the processor 902, and the memory 901 are connected to each other through the bus 904. The bus 904 may be a PCI bus, an EISA bus, or the like. The bus may be classified into an address bus, a data bus, a control bus, and the like. For ease of representation, only one thick line is used to represent the bus in FIG. 9, but this does not mean that there is only one bus or only one type of bus.

In a specific embodiment, the processor 902 is configured to: receive a flow matching rule sent by a controller, where the flow matching rule includes a correspondence between packet attribute information and a flow identification; receive a packet including the packet attribute information; obtain the flow identification based on the packet attribute information and the flow matching rule; add the flow identification to the packet; determine a forwarding path used to forward the packet, and forward the packet including the flow identification along the forwarding path. For a detailed processing process of the processor 902, refer to the detailed descriptions of the processes S215, S216, S217, S218, and S219 in the embodiment shown in FIG. 2A-1 and FIG. 2A-2, and the processes S316, S317, S318, S319, and S320 in the embodiment shown in FIG. 3B. Details are not described herein again.

The network interface 903 is used by the network device 900 to receive the flow matching rule, and a segment identification list, and send and receive a packet through a network system. For a specific process, refer to the detailed descriptions of S215, S216, and S219 in the embodiment shown in FIG. 2A-1 and FIG. 2A-2, and S316, S317, and S320 in the embodiment shown in FIG. 3B. Details are not described herein again.

Figure 10:
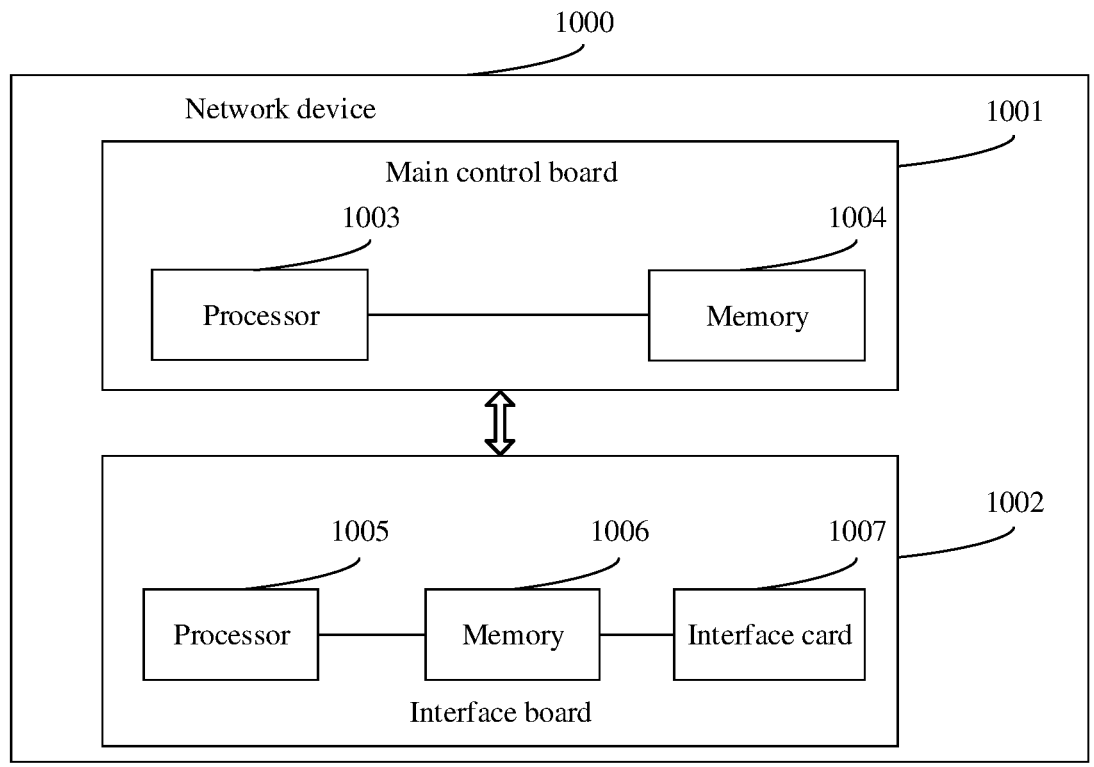
FIG. 10 is a schematic structural diagram of a network device according to an embodiment of this disclosure.

FIG. 10 is another possible schematic structural diagram of the network device in the foregoing embodiment. The network node 1000 includes a main control board 1001 and an interface board 1002. The main control board 1001 includes a processor 1003 and a memory 1004. The interface board includes a processor 1005, a memory 1006, and an interface card 1007. The main control board 1001 and the interface board 1002 are coupled.

The hardware may implement a corresponding function of the network device 202 in the embodiment shown in FIG. 2A-1 and FIG. 2A-2 or the network device 302 in the embodiment shown in FIG. 3B. For example, the memory 1006 is configured to store program code of the interface board 1002. The processor 1005 is configured to invoke the program code in the memory 1006 to trigger the interface card 1007 to perform various information receiving and sending performed by the network device 202 or the network device 302 in the foregoing method embodiments. The memory 1004 may be configured to store program code of the main control board 1001, and the processor 1003 is configured to invoke the program code in the memory 1004 to perform processing other than information receiving and sending performed by the network device 202 or the network device 302 in the foregoing method embodiments.

For example, the processor 1005 is configured to: trigger the interface card 1007 to receive a flow matching rule sent by a controller, where the flow matching rule includes a correspondence between packet attribute information and a flow identification; receive a packet including the packet attribute information; and forward a packet including the flow identification along a forwarding path. The processor 1003 is configured to: obtain the flow identification based on the packet attribute information and the flow matching rule; add the flow identification to the packet; and determine the forwarding path used to forward the packet. The memory 1004 is configured to store the program code and data of the main control board 1001, and the memory 1006 is configured to store the program code and data of the interface board 1002.

In an example, an IPC channel is established between the main control board 1001 and the interface board 1002, and communication is performed between the main control board 1001 and the interface board 1002 through the IPC channel. For example, the main control board 1001 receives, from the interface board 1002 through the IPC channel, the flow matching rule and the packet including the packet attribute information.

The network device 1000 may be a router, a switch, or a network device having a forwarding function. The network device 1000 can implement a function of the network device 202 in the embodiment shown in FIG. 2A-1 and FIG. 2A-2 or the network device 302 in the embodiment shown in FIG. 3B. For specific execution steps, refer to the foregoing method embodiments. Details are not described herein again.

Figure 11:
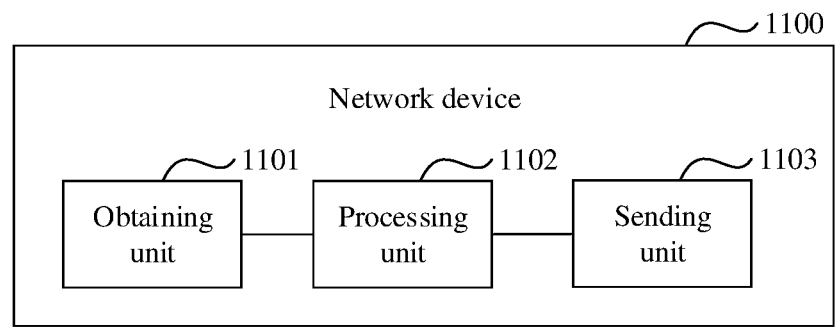
FIG. 11 is a schematic structural diagram of a network device according to an embodiment of this disclosure.

FIG. 11 is a possible schematic structural diagram of the network device in the foregoing embodiment. The network device 1100 may implement a function of the network device 203 in the embodiment shown in FIG. 2A-1 and FIG. 2A-2 or the network device 303 in the embodiment shown in FIG. 3B. Refer to FIG. 11. The network device 1100 includes: a receiving unit 1101, and a processing unit 1102. These units may perform corresponding functions of the network device in the foregoing method embodiment. For example, the receiving unit 1101 is configured to: receive a flow policy sent by a controller, where the flow policy includes a correspondence between a flow identification and a flow behavior, and the flow identification is used to identify a packet including packet attribute information; and receive a packet including the flow identification; and the processing unit 1102 is configured to: obtain the flow identification from the packet, obtain the flow behavior from the flow policy based on the flow identification, and process the packet in a packet processing mode corresponding to the flow behavior.

Figure 12:
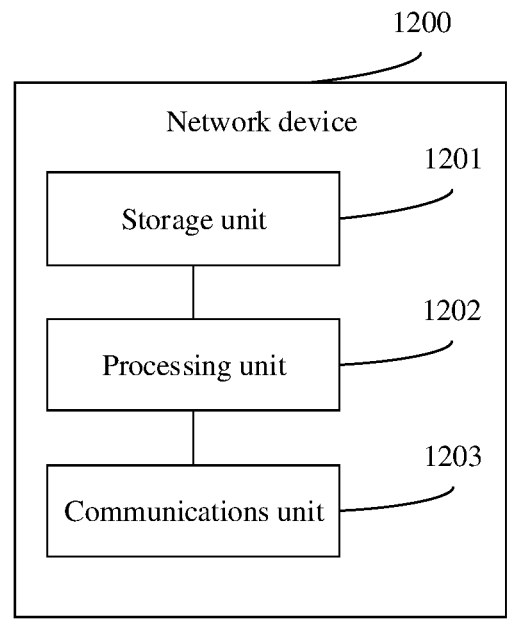
FIG. 12 is a schematic structural diagram of a network device according to an embodiment of this disclosure.

When an integrated unit is used, FIG. 12 is another possible schematic structural diagram of the network device in the foregoing embodiment. The network device 1200 may implement a function of the network device 203 in the embodiment shown in FIG. 2A-1 and FIG. 2A-2 or the network device 303 in the embodiment shown in FIG. 3B.

The network device 1200 includes: a storage unit 1201, a processing unit 1202, and a communications unit 1203. The processing unit 1202 is configured to control and manage an action of the network device 1200. For example, the processing unit 1202 is configured to support the network device 1200 in performing processes S220, S221, S222, and S223 in FIG. 2A-2, processes S321, S322, S323, and S324 in FIG. 3B, and/or another process used in the technology described in this specification. The communications unit 1203 is configured to support communication between the network device 1200 and another network entity, for example, communication with the controller 201 and the network device 202 in the embodiment shown in FIG. 2A-1 and FIG. 2A-2 or communication with the controller 301 and the network device 302 in the embodiment shown in FIG. 3A and FIG. 3B. The storage unit 1201 is configured to store program code and data of the network device 1200.

The processing unit 1202 may be a processor, for example, may be a CPU, a general-purpose processor, a DSP, an ASIC, an FPGA, or another programmable logic device, a transistor logic device, a hardware component, or any combination thereof. The processor may implement or execute various example logical blocks, modules, and circuits described with reference to content disclosed in the embodiments of this disclosure. The processor may alternatively be a combination of processors implementing a computing function, for example, a combination of one or more microprocessors, or a combination of the DSP and a microprocessor. The communications unit 1203 may be a network interface. The storage unit 1201 may be a memory.

Figure 13:
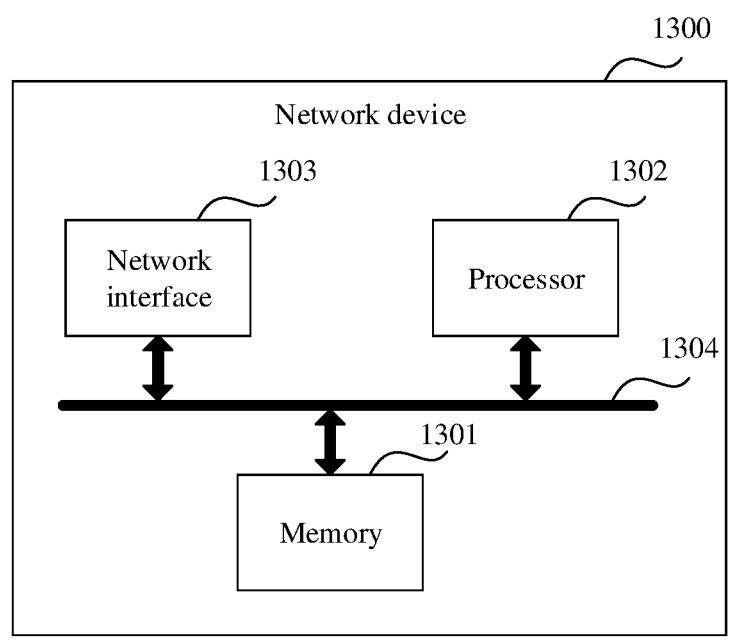
FIG. 13 is a schematic structural diagram of a network device according to an embodiment of this disclosure.

When the processing unit 1202 is the processor, the communications unit 1203 is the network interface, and the storage unit 1201 is the memory, the network device in the embodiments of the present invention may be a network device 1300 shown in FIG. 13.

FIG. 13 is a possible schematic structural diagram of the network device in the foregoing embodiment. The network device 1300 includes: a processor 1302, a network interface 1303, a memory 1301, and a bus 1304.

The memory 1301 is configured to store instructions. When the embodiment shown in FIG. 11 is implemented and the units described in the embodiment in FIG. 11 are implemented by using software, software or program code required for performing functions of the receiving unit 1101 and the processing unit 902 in FIG. 11 is stored in the memory 1301.

The processor 1302 is configured to execute the instructions in the memory 1301, to perform the foregoing packet processing method applied to the embodiment shown in FIG. 2A-1 and FIG. 2A-2 or FIG. 3A and FIG. 3B.

The network interface 1303 is configured to communicate with another network device. The network interface 1303 may be an Ethernet interface, an asynchronous transfer mode (ATM) interface, or the like.

The network interface 1303, the processor 1302, and the memory 1301 are connected to each other through the bus 1304. The bus 1304 may be a PCI bus, an EISA bus, or the like. The bus may be classified into an address bus, a data bus, a control bus, and the like. For ease of representation, only one thick line is used to represent the bus in FIG. 13, but this does not mean that there is only one bus or only one type of bus.

In a specific embodiment, the processor 1302 is configured to: receive a flow policy sent by a controller, where the flow policy includes a correspondence between a flow identification and a flow behavior, and the flow identification is used to identify a packet including packet attribute information; receive a packet including the flow identification, and obtain the flow identification from the packet; obtain the flow behavior from the flow policy based on the flow identification; and process the packet in a packet processing mode corresponding to the flow behavior. For a detailed processing process of the processor 1302, refer to the detailed descriptions of the processes S220, S221, S222, and S223 in the embodiment shown in FIG. 2A-2, and the processes S321, S322, S323, and S324 in the embodiment shown in FIG. 3B. Details are not described herein again.

The network interface 1303 is used by the network device to receive the flow policy and send and receive a packet through a network system. For a specific process, refer to the detailed descriptions of S220 and S221 in the embodiment shown in FIG. 2A-2, and S321 and S322 in the embodiment shown in FIG. 3B. Details are not described herein again.

Figure 14:
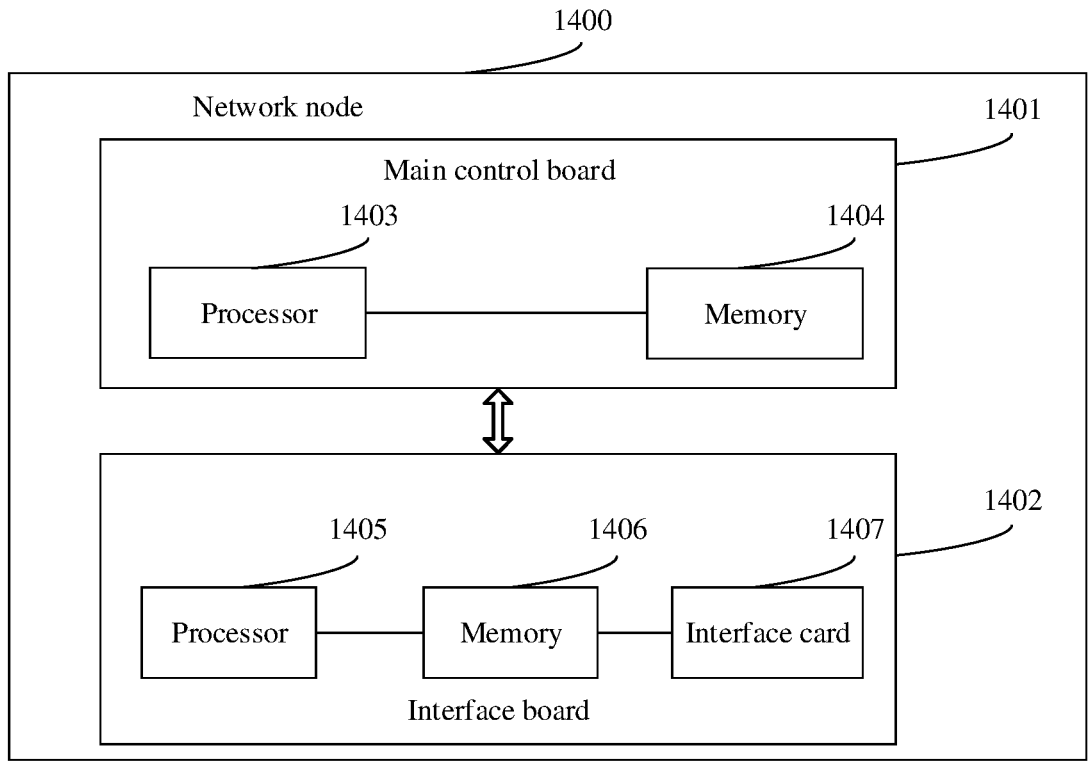
FIG. 14 is a schematic structural diagram of a network device according to an embodiment of this disclosure.

FIG. 14 is another possible schematic structural diagram of the network device in the foregoing embodiment. The network device 1400 includes a main control board 1401 and an interface board 1402. The main control board 1401 includes a processor 1403 and a memory 1404. The interface board includes a processor 1405, a memory 1406, and an interface card 1407. The main control board 1401 and the interface board 1402 are coupled.

The hardware may implement a corresponding function of the network device 203 in the embodiment shown in FIG. 2A-1 and FIG. 2A-2 or the network device 303 in the embodiment shown in FIG. 3A and FIG. 3B. For example, the memory 1406 is configured to store program code of the interface board 1402. The processor 1405 is configured to invoke the program code in the memory 1406 to trigger the interface card 1407 to perform various information receiving and sending performed by the network device 203 or the network device 303 in the foregoing method embodiments. The memory 1404 may be configured to store program code of the main control board 1401, and the processor 1403 is configured to invoke the program code in the memory 1404 to perform processing other than information receiving and sending performed by the network device 203 or the network device 303 in the foregoing method embodiments.

For example, the processor 1405 is configured to: trigger the interface card 1407 to receive a flow policy sent by a controller, where the flow policy includes a correspondence between a flow identification and a flow behavior, and the flow identification is used to identify a packet including packet attribute information; and receive a packet including the flow identification. The processor 1403 is configured to: obtain the flow identification from the packet; obtain the flow behavior from the flow policy based on the flow identification; and process the packet in a packet processing mode corresponding to the flow behavior. The memory 1404 is configured to store the program code and data of the main control board 1401, and the memory 1406 is configured to store the program code and data of the interface board 1402.

In an example, an IPC channel is established between the main control board 1401 and the interface board 1402, and communication is performed between the main control board 1401 and the interface board 1402 through the IPC channel. For example, the main control board 1401 receives, from the interface board 1402 through the IPC channel, the flow policy and the packet including the flow identification.

The network device 1400 may be a router, a switch, or a network device having a forwarding function. The network device 1400 can implement a function of the network device 203 in the embodiment shown in FIG. 2A-1 and FIG. 2A-2 or the network device 303 in the embodiment shown in FIG. 3A and FIG. 3B. For specific execution steps, refer to the foregoing method embodiments. Details are not described herein again.

Figure 15:
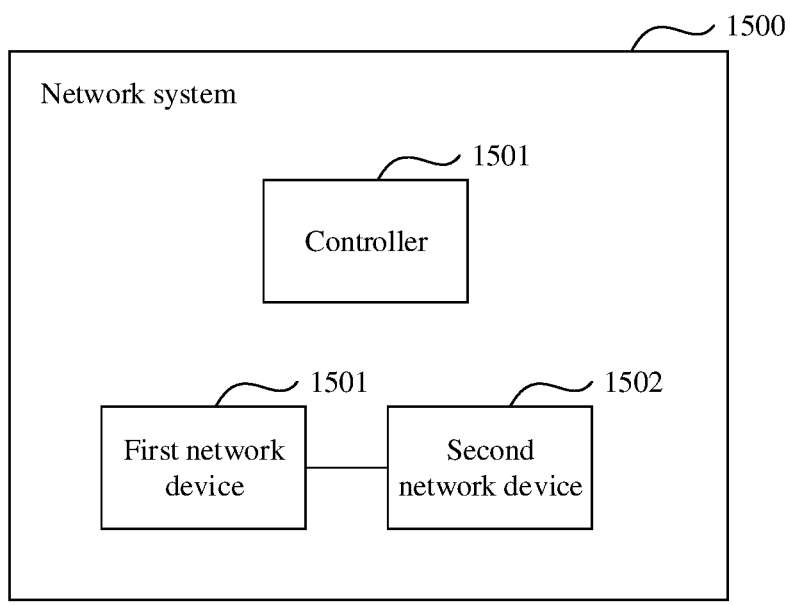
FIG. 15 is a schematic structural diagram of a network device according to an embodiment of this disclosure.

FIG. 15 is a possible schematic structural diagram of a network system according to an embodiment of this disclosure. The network system 1500 includes a controller 1501, a first network device 1502, and a second network device 1503. The controller 1501 in the network system may perform processing steps of the controller 201 in the embodiment shown in FIG. 2A-1 or the controller 301 in the embodiment shown in FIG. 3A. The first network device 1502 in the network system may perform processing steps of the network device 202 in the embodiment shown in FIG. 2A-1 and FIG. 2A-2 or the network device 302 in the embodiment shown in FIG. 3B. The second network device 1503 in the network system may perform processing steps of the network device 203 in the embodiment shown in FIG. 2A-2 or the network device 303 in the embodiment shown in FIG. 3B. Correspondingly, the controller 1501 in the network system may be the controller 400 in the embodiment shown in FIG. 4, the first network device 1502 may be the network device 700 in the embodiment shown in FIG. 7, and the second network device 1503 may be the network device 1100 in the embodiment shown in FIG. 11, or correspondingly, the controller 1501 in the network system may be the controller 500 in the embodiment shown in FIG. 5, the first network device 1502 may be the network device 800 in the embodiment shown in FIG. 8, and the second network device 1503 may be the network device 1200 in the embodiment shown in FIG. 12, or correspondingly, the controller 1501 in the network system may be the controller 600 in the embodiment shown in FIG. 6, the first network device 1502 may be the network device 900 in the embodiment shown in FIG. 9, and the second network device 1503 may be the network device 1300 in the embodiment shown in FIG. 13.

Specifically, the controller is configured to determine a forwarding path used to forward a packet, where the forwarding path includes the first network device and the second network device; obtain a flow identification based on packet attribute information and a flow matching rule, where the flow matching rule includes a correspondence between the packet attribute information and the flow identification, and the flow identification is used to identify a packet including the packet attribute information; generate a first flow policy, where the first flow policy includes a correspondence between the flow identification and a first flow behavior, send the flow matching rule to the first network device, and send the first flow policy to the second network device.

The first network device is configured to: receive the flow matching rule sent by the controller; receive the packet including the packet attribute information; obtain the flow identification based on the packet attribute information and the flow matching rule; add the flow identification to the packet; determine the forwarding path; and forward the packet including the flow identification along the forwarding path.

The second network device is configured to: receive the first flow policy sent by the controller; receive the packet including the flow identification, and obtain the flow identification from the packet; obtain the first flow behavior from the first flow policy based on the flow identification; and process the packet in a packet processing mode corresponding to the first flow behavior.

An embodiment of this disclosure further provides a non-volatile storage medium, configured to store software instructions used in the foregoing embodiments. The non-volatile storage medium includes a program used to perform the methods shown in the foregoing embodiments. When the program is executed on a computer or a network device, the computer or the network device is enabled to perform the methods in the foregoing method embodiments.

An embodiment of this disclosure further provides a computer program product including computer program instructions. When the computer program product runs on a network node, the network node is enabled to perform the methods in the foregoing method embodiments.

In this disclosure, "at least one item (piece)" means one or more, and "a plurality of" means two or more. "At least one of the following items (pieces)" or a similar expression thereof means any combination of the items, including any combination of one item (piece) or a plurality of items (pieces). For example, at least one item (piece) of a, b, or c may represent: a, b, c, a and b, a and c, b and c, or a, b, and c, where a, b, and c may be singular or plural.

"first" in the first network device, the first flow behavior, the first flow policy, and the first control packet mentioned in the embodiments of this disclosure is merely used for name identification, and does not represent the first in a sequence. The rule is also applicable to "second", "third", and the like.

It should be noted that any apparatus embodiment described above is merely an example. The units described as separate parts may or may not be physically separate, and parts displayed as units may or may not be physical units, may be located in one position, or may be distributed on a plurality of network units. Some or all the modules may be selected based on actual needs to achieve the objectives of the solutions of the embodiments. In addition, in the accompanying drawings of the network node embodiments provided by the present invention, connection relationships between modules indicate that the modules have communications connections with each other, which may be specifically implemented as one or more communications buses or signal cables. A person of ordinary skill in the art may understand and implement the embodiments of the present invention without creative efforts.

Methods or algorithm steps described in the content disclosed in the embodiments of the present invention may be implemented by hardware, or may be implemented by a processor by executing software instructions. The software instructions may include a corresponding software module. The software module may be stored in a random access memory (RAM), a flash memory, a read only memory (ROM), an erasable programmable read only memory (EPROM), an electrically erasable programmable read only memory (EEPROM), a hard disk, a removable hard disk, a compact disc, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a network node. Certainly, the processor and the storage medium may exist in the network node as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing example embodiments. It should be understood that the foregoing descriptions are merely example embodiments of the present invention, but are not intended to limit the protection scope of the present invention. Any modification, equivalent replacement, or improvement made based on the technical solution of the present invention shall fall within the protection scope of the present invention.

What is claimed is:

1. A device comprising:
   at least one processor;
   one or more memories coupled to the at least one processor and storing programming instructions, wherein the at least one processor is configured to execute the programming instructions to cause the device to:
   obtain a flow identification based on packet attribute information and a flow matching rule, wherein the flow matching rule comprises a correspondence between the packet attribute information and the flow identification, and the flow identification is used to identify a packet comprising the packet attribute information;
   generate a first flow policy, wherein the first flow policy comprises a correspondence between the flow identification and a first flow behavior, wherein the first flow behavior corresponds to a packet processing mode;
   determine a forwarding path of the packet comprising the packet attribute information;
   send the flow matching rule to an ingress device of the forwarding path, to indicate to the ingress device to add the flow identification to the packet comprising the packet attribute information; and
   send the first flow policy to a first network device on the forwarding path, to indicate to the first network device to process, in the packet processing mode corresponding to the first flow behavior, the packet comprising the flow identification;
   wherein the packet attribute information includes at least one of the following; identification information of an application, network performance requirement information of an application, a virtual local area network (VLAN) tag, identification information of a user, a priority of a packet, or a differentiated services code point (DSCP) of the packet.

2. The device according to claim 1, wherein the at least one processor is further configured to execute the programming instructions to cause the device to:
   obtain path information used to determine the forwarding path, wherein the path information comprises a destination address and a source address;
   search for the forwarding path based on the path information; and
   select a segment identification list corresponding to the forwarding path, wherein the segment identification list comprises a segment identification of at least one network device on the forwarding path.

3. The device according to claim 2, wherein the segment identification list comprises a first segment identification, the first segment identification is a segment identification of the first network device, and the at least one processor is further configured to execute the programming instructions to cause the device to:
   add the flow identification to the first segment identification; and
   send the segment identification list comprising the flow identification to the ingress device, wherein the segment identification list is used to indicate to forward a packet comprising the path information and the packet attribute information along the forwarding path.

4. The device according to claim 1, wherein the at least one processor is further configured to execute the programming instructions to cause the device to:
   obtain path information used to determine the forwarding path, wherein the path information comprises a destination address and a source address;
   calculate the forwarding path based on the path information; and
   generate a segment identification list corresponding to the forwarding path, wherein the segment identification list comprises a segment identification of at least one network device on the forwarding path.

5. The device according to claim 2, wherein the at least one processor is further configured to execute the programming instructions to cause the device to:
   send the segment identification list to the ingress device, wherein the segment identification list is used to indicate to forward a packet comprising the path information and the packet attribute information along the forwarding path.

6. The device according to claim 3, wherein the first segment identification comprises a function field and an argument field, and the at least one processor is further configured to execute the programming instructions to cause the device to:
   add the flow identification to the argument field of the first segment identification; and
   add a read identification to the function field of the first segment identification, wherein the read identification is used to indicate to read the flow identification in the argument field of the first segment identification.

7. The device according to claim 1, wherein the at least one processor is further configured to execute the programming instructions to cause the device to:
   generate the flow matching rule based on the packet attribute information.

8. The device according to claim 1, wherein the at least one processor is further configured to execute the programming instructions to cause the device to:
   generate a second flow policy, wherein the second flow policy comprises a correspondence between the flow identification and a second flow behavior, wherein the second flow behavior is different from the first flow behavior; and
   send the second flow policy to a second network device, wherein the second network device is a network device on the forwarding path, and the second flow policy is used to indicate to the second network device to process, in a second packet processing mode corresponding to the second flow behavior, the packet comprising the flow identification.

9. The device according to claim 1, wherein:
   the first flow behavior corresponding to the packet processing mode includes packet filtering, redirection, and/or traffic statistics collection.

10. A network device comprising:
    at least one processor;
    one or more memories coupled to the at least one processor and storing programming instructions, wherein the at least one processor is configured to execute the programming instructions to cause the network device to:
    receive a flow matching rule, wherein the flow matching rule comprises a correspondence between packet attribute information and a flow identification;

receive a packet comprising the packet attribute information;

obtain the flow identification based on the packet attribute information and the flow matching rule;

add the flow identification to the packet; and forward the packet comprising the flow identification along a forwarding path, wherein the packet attribute information includes at least one of the following: identification information of an application, network performance requirement information of an application, a virtual local area network (VLAN) tag, identification information of a user, a priority of a packet, or a differentiated services code point (DSCP) of the packet.

11. The network device according to claim 10, wherein the at least one processor is further configured to execute the programming instructions to cause the network device to:

receive a segment identification list corresponding to the forwarding path, wherein the forwarding path is determined using path information comprising a destination address and a source address, the segment identification list comprises a segment identification of at least one network device on the forwarding path, and the segment identification list comprises the flow identification; and encapsulate the segment identification list comprising the flow identification into the packet.

12. The network device according to claim 10, wherein the at least one processor is further configured to execute the programming instructions to cause the network device to:

receive a segment identification list corresponding to the forwarding path, wherein the forwarding path is determined using path information comprising a destination address and a source address, and the segment identification list comprises a segment identification of at least one network device on the forwarding path; and add the flow identification to a first segment identification in the segment identification list, wherein the first segment identification is the segment identification of the at least one network device on the forwarding path; and encapsulate the segment identification list comprising the flow identification into the packet.

13. The network device according to claim 12, wherein the first segment identification comprises a function field and an argument field, and the at least one processor is further configured to execute the programming instructions to cause the network device to:

add the flow identification to the argument field of the first segment identification; and add a read identification to the function field of the first segment identification, wherein the read identification is used to indicate to read the flow identification in the argument field of the first segment identification.

14. The network device according to claim 10, wherein the at least one processor is further configured to execute the programming instructions to cause the network device to:

add the flow identification to a type-length-value (TLV) of a segment routing header (SRH) of the packet; or add the flow identification to a traffic class (TC) field or a type of service (ToS) field in a header of the packet.

15. The network device according to claim 10, wherein the flow identification is used to indicate to at least one network device on the forwarding path to process the packet comprising the flow identification in a first packet processing mode corresponding to a first flow behavior, and the flow identification is further used to indicate to another network device on the forwarding path to process the packet comprising the flow identification in a second packet processing mode corresponding to a second flow behavior, wherein the second flow behavior is different from the first flow behavior.

16. A network device comprising:

at least one processor;

one or more memories coupled to the at least one processor and storing programming instructions, wherein the at least one processor is configured to execute the programming instructions to cause the network device to:

receive a flow policy, wherein the flow policy comprises a correspondence between a flow identification and a flow behavior, wherein the flow behavior corresponds to a packet processing mode, and the flow identification is used to identify a packet comprising packet attribute information;

receive a packet comprising the flow identification, and obtain the flow identification from the packet;

obtain the flow behavior from the flow policy based on the flow identification; and process, in the packet processing mode corresponding to the flow behavior, the packet comprising the flow identification;

wherein the packet attribute information includes at least one of the following: identification information of an application, network performance requirement information of an application, a virtual local area network (VLAN) tag, identification information of a user, a priority of a packet, or a differentiated services code point (DSCP) of the packet.

17. The network device according to claim 16, wherein the at least one processor is further configured to execute the programming instructions to cause the network device to:

obtain a segment identification from a destination address field in a header of the packet; and obtain the flow identification from the segment identification.

18. The network device according to claim 17, wherein the segment identification comprises a function field and an argument field, the function field comprises a read identification, the read identification is used to indicate to read the flow identification in the argument field of the segment identification, and the argument field comprises the flow identification; and the at least one processor is further configured to execute the programming instructions to cause the network device to:

obtain the read identification from the function field; and obtain the flow identification from the argument field of the segment identification according to the read identification.

19. The network device according to claim 16, wherein:

the flow behavior corresponding to the packet processing mode includes packet filtering, redirection, and/or traffic statistics collection.

* * * * *